(12) United States Patent
Crook et al.

(10) Patent No.: US 9,466,297 B2
(45) Date of Patent: Oct. 11, 2016

(54) COMMUNICATION SYSTEM

(71) Applicant: Microsoft Technology Licensing, LLC, Redmond, WA (US)

(72) Inventors: Paul Crook, Bellevue, WA (US); Ruhi Sarikaya, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 141 days.

(21) Appl. No.: 14/564,532

(22) Filed: Dec. 9, 2014

(65) Prior Publication Data
US 2016/0163311 A1 Jun. 9, 2016

(51) Int. Cl.
| | | |
|---|---|---|
| G10L 21/00 | (2013.01) | |
| G10L 15/22 | (2006.01) | |
| G10L 15/26 | (2006.01) | |
| G10L 15/065 | (2013.01) | |
| G10L 15/18 | (2013.01) | |
| G06F 17/27 | (2006.01) | |
| G10L 15/12 | (2006.01) | |
| G10L 15/08 | (2006.01) | |
| G10L 15/02 | (2006.01) | |
| G10L 15/30 | (2013.01) | |
| G10L 15/10 | (2006.01) | |
| G10L 15/06 | (2013.01) | |

(52) U.S. Cl.
CPC .......... G10L 15/22 (2013.01); G06F 17/2785 (2013.01); G10L 15/065 (2013.01); G10L 15/1815 (2013.01); G10L 15/265 (2013.01); G10L 15/02 (2013.01); G10L 15/08 (2013.01); G10L 15/10 (2013.01); G10L 15/12 (2013.01); G10L 15/30 (2013.01); G10L 2015/0635 (2013.01); G10L 2015/0638 (2013.01); G10L 2015/088 (2013.01); G10L 2015/223 (2013.01)

(58) Field of Classification Search
USPC ....... 704/275, 270, 231, 232, 236, 237, 238, 704/239, 240, 251
See application file for complete search history.

(56) References Cited

U.S. PATENT DOCUMENTS

| | | |
|---|---|---|
| 7,386,449 B2 | 6/2008 | Sun et al. |
| 7,519,529 B1 | 4/2009 | Horvitz |

(Continued)

OTHER PUBLICATIONS

PCT International Search Report in PCT/US2015/064353, mailed Mar. 7, 2016, 14 pages.

(Continued)

*Primary Examiner* — Vu B Hang
(74) *Attorney, Agent, or Firm* — Tom Wong; Steven Spellman; Micky Minhas

(57) ABSTRACT

Systems and methods for responding to spoken language input or multi-modal input are described herein. More specifically, one or more user intents are determined or inferred from the spoken language input or multi-modal input to determine one or more user goals via a dialogue belief tracking system. The systems and methods disclosed herein utilize the dialogue belief tracking system to perform actions based on the determined one or more user goals and allow a device to engage in human like conversation with a user over multiple turns of a conversation. Preventing the user from having to explicitly state each intent and desired goal while still receiving the desired goal from the device, improves a user's ability to accomplish tasks, perform commands, and get desired products and/or services. Additionally, the improved response to spoken language inputs from a user improves user interactions with the device.

20 Claims, 11 Drawing Sheets

(56) References Cited

U.S. PATENT DOCUMENTS

| | | |
|---|---|---|
| 8,577,671 B1 | 11/2013 | Barve et al. |
| 8,595,016 B2 | 11/2013 | Van Sciver et al. |
| 8,812,323 B2 | 8/2014 | Tong et al. |
| 2011/0144999 A1 | 6/2011 | Jang et al. |

OTHER PUBLICATIONS

Yi MA et al. "Landmark-Bsed Location Belief Tracking in a Spoken Dialog System" Proceedings of the 13th Annual Meeting of the Special Interest Group of Discourse and Dialogue (SIDGIAL), etrieved at http://www.aclweb.org/anthology/W12-1624, Jul. 5, 2012, 10 pages.

Li Xiang et al: 11 Personal knowledge graph population from user utterances in conversational understanding, 2014 IEEE Spoken Language Technology Workshop (SLT), IEEE, Dec. 7, 2014, 6 pages.

Yi MA et al "Knowledge Graph Inference for spoken dialog systems", 2015 IEEE International Conference on Acoustics, Speech and Signal Processing (ICASSP), Apr. 1, 2015, 5 Pages.

Michael J Cafarella et al: 11 Relational Web Search, WWW2006 XP055251611, Edinburgh, Uk, Retrieved at : https://homes.cs.washington.edu/-etzioni/papers/UW-CSE-06-04-02.pdf, Jan. 1, 2006, 9 pages.

Lambert, Benjamin E., "A Knowledge-Based Architecture for using Semantics in Automatic Speech Recognition", In PhD Thesis, Retrieved on: Sep. 29, 2014, 69 pages.

Kang, S. et al., "A dialogue Management System using a Corpus-Based Framework and a Dynamic Dialogue Transition Model", In Journal of Al Communications, vol. 26, Issue 2, Apr. 2013, 14 pages.

Ludwig, Bernd, "Knowledge-Based Dialogue Management", Published on: Sep. 1999 Available at: http://www.researchgate.net/publication/2307462_Knowledge-Based_Dialogue_Management, 1 page.

Williams, Jason D., "Multi-Domain Learning and Generalization in Dialog State Tracking", In Proceedings of 14th Annual Meeting of the Special Interest Group on Discourse and Dialogue, Aug. 22, 2013, pp. 433-441.

"Dialog State Tracking Challenge", Retrieved on: Sep. 29, 2014 Available at: http://research.microsoft.com/en-us/events/dstc/, 2 pgs.

"Dialogue, Representation, Inference and Learning Strategies", Retrieved on: Sep. 29, 2014 Available at: http://shodhganga.inflibnet.ac.in/bitstream/10603/9789/4/chapter3.pdf, 21 pgs.

Marietto, et al., "A new graphical representation of the Chatterbot's knowledge base", Iln Proceedings of 10th International Conference on Active Media Technology, Aug. 11, 2014, 1 page.

Chimir, et al., "Deductive Inference in the Context of the Dialogue Process", In Proceedings of the International Arab Journal of Information Technology, vol. 4, No. 4, Oct. 2007, pp. 330-337.

Schnelle-Walka, et al., "A Pattern Language for Dialogue Management", In Proceeding of VikingPLoP—Nordic conference on Pattern Languages of Programs, Mar. 2, 2012, 21 pages.

Morchid, et al., "Improving Dialogue Classification using a Topic Space Representation and a Gaussian Classifier based on the Decision Rule", In Proceedings of IEEE International Conference on Acoustic, Speech and Signal Processing, May 4, 2014, pp. 126-130.

Raux, et al., "Efficient Probabilistic Tracking of User Goal and Dialog History for Spoken Dialog Systems", In Proceedings of 12th Annual Conference of the International Speech Communication Association, Aug. 27, 2011, 4 pages.

Thomson, et al., "Bayesian Update of Dialogue State: A POMDP Framework for Spoken Dialogue Systems", In Journal of Computer Speech and Language, vol. 24, Issue 10, Oct. 2010, 35 pages.

Young, et al., "The Hidden Information State Model: a practical framework for POMDP-based spoken dialogue management", In Journal of Computer Speech and Language, vol. 24, Issue 02, Apr. 2010, 25 pages.

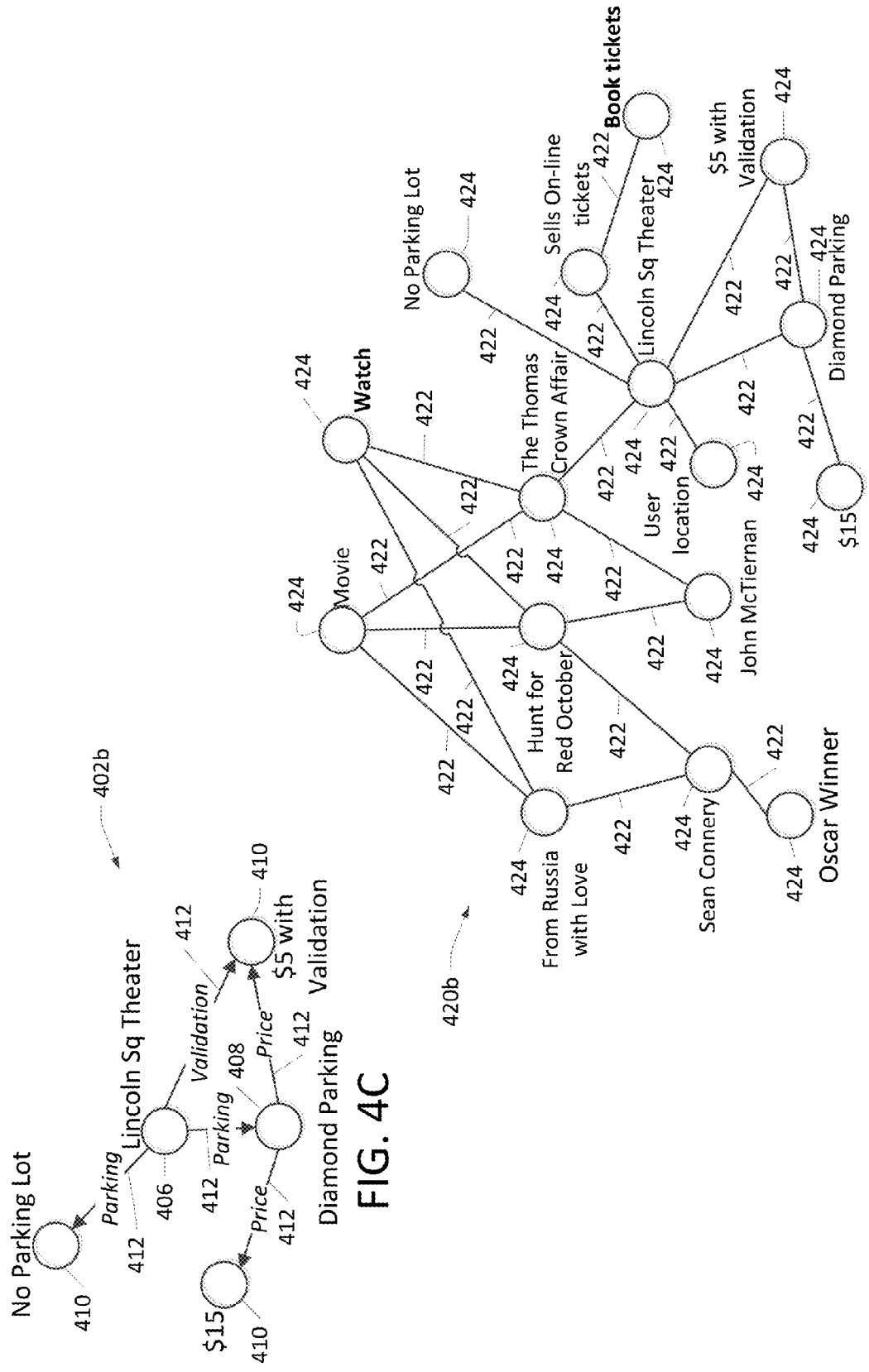

COMMUNICATION SYSTEM

BACKGROUND

Various spoken dialogue systems have been developed and designed to provide a machine with the ability to converse with a user. For example, mobile devices currently utilize spoken dialogue systems to interact with users. The interactions include retrieving data, sending messages, responding verbally to user, and placing phone calls based on received spoken requests or input from a user.

It is with respect to these and other general considerations that embodiments disclosed herein have been made. Also, although relatively specific problems may be discussed, it should be understood that the embodiments should not be limited to solving the specific problems identified in the background or elsewhere in this disclosure.

SUMMARY

In summary, the disclosure generally relates to systems and method for responding to spoken language input or multi-modal input. More specifically, one or more user intents are determined or inferred from spoken language input or multi-modal input to determine one or more user goals via a dialogue belief tracking system. The systems and methods disclosed herein utilize the dialogue belief tracking system to perform actions based on the determined one or more user goals and allow a device to engage in human like conversation with a user over multiple turns of a conversation. Preventing the user from having to explicitly state each intent and desired goal while still receiving the desired goal from the device, improves a user's ability to accomplish tasks, perform commands, and get desired products and/or services. Additionally, the improved response to spoken language inputs from a user improves user interactions with the device.

One aspect of the disclosure is directed to a method for controlling a response to spoken language input. The method includes receiving user data and a first spoken language input from the device and identifying tags within the first spoken language input. The method further includes searching a knowledge base framework based on the tags and the user data. The knowledge base framework is a database that includes a plurality of entities, attributes, and relationships between the entities and the attributes. Additionally, the method includes identifying entities, attributes, and relationship within the knowledge base framework that match at least one of the tags and the user data and identifying at least one interconnected item within the knowledge base framework that did not match any of the tags and the user data to form at least one inferred item. The method also includes creating a state graph based on a portion of the knowledge base framework that includes any matched entities, matched attributes, identified relationships, and the at least one inferred item, and based on the tags. The state graph is created at least in part by transforming the portion of the knowledge base framework into a probabilistic model graph by replacing the identified relationships with weighted connections and by assigning a confidence indicator to each node of the state graph. The method also includes determining at least one goal based on the state graph and sending instructions to perform an action to the device based on the at least one goal, the weighted connections, and the confidence indicators.

Another aspect of the disclosure includes a system. The system comprises a computing device including a processing unit and a memory. The processing unit implements a spoken language system and a dialogue state belief tracking system. The spoken language system is operable to receive a spoken language input, identify tags within the spoken language input, and communicate with the dialogue state belief tracking system. The dialogue state belief tracking system is operable to communicate with the spoken language system and to search a knowledge base framework based on the tags identified by the spoken language system. The dialogue state belief tracking system is further operable to identify entities, attributes, and relationships within the knowledge base framework that match at least some of the tags and to create a state graph based on a portion of the knowledge base framework that includes any matched entities, matched attributes, and identified relationships. The state graph is formed by transforming the portion into a probabilistic model graph and by adding evidence nodes to the probabilistic model graph based on the tags. The state graph includes a confidence indicator for each node of the state graph. Additionally, the dialogue state belief tracking system is operable to rank nodes of the state graph and to determine at least one goal based on the rank of the nodes of the state graph. The dialogue state belief tracking system is also operable to send instructions to perform an action based on the at least one goal.

Yet another aspect of the disclosure includes a computer-readable storage medium including computer-executable instructions stored thereon. The computer-executable instructions when executed by a computing system in a distributed network cause the computing system to perform a method. The method includes receiving user data and a second spoken language input from a device. The method also includes identifying tags within the second spoken language input in view of previously determined tags from a first spoken language input in a conversation between a user and the device. The method further includes searching a knowledge base framework based on the tags and the user data and identifying entities, attributes, and relationship within the knowledge base framework that match at least one of the tags and the user data. Additionally, the method includes creating an updated state graph based on a portion of the knowledge base framework that includes any matched entities, matched attributes, and identified relationships by aligning any of the matched entities and the matched attributes to a node in a stored state graph. The updated state graph is formed, at least in part, by transforming the portion of the knowledge base framework into a probabilistic model graph. Further, the method includes determining at least one user goal based on the updated state graph and sending instructions to perform an action to the device based on the at least one user goal and a confidence indicator for the at least one user goal.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

FIG. 4C is a graph illustrating an example portion of a knowledge base framework.

FIG. 4D illustrates an example state graph based on the portion of the knowledge base framework shown in FIG. 4A.

DETAILED DESCRIPTION

Figure 1:
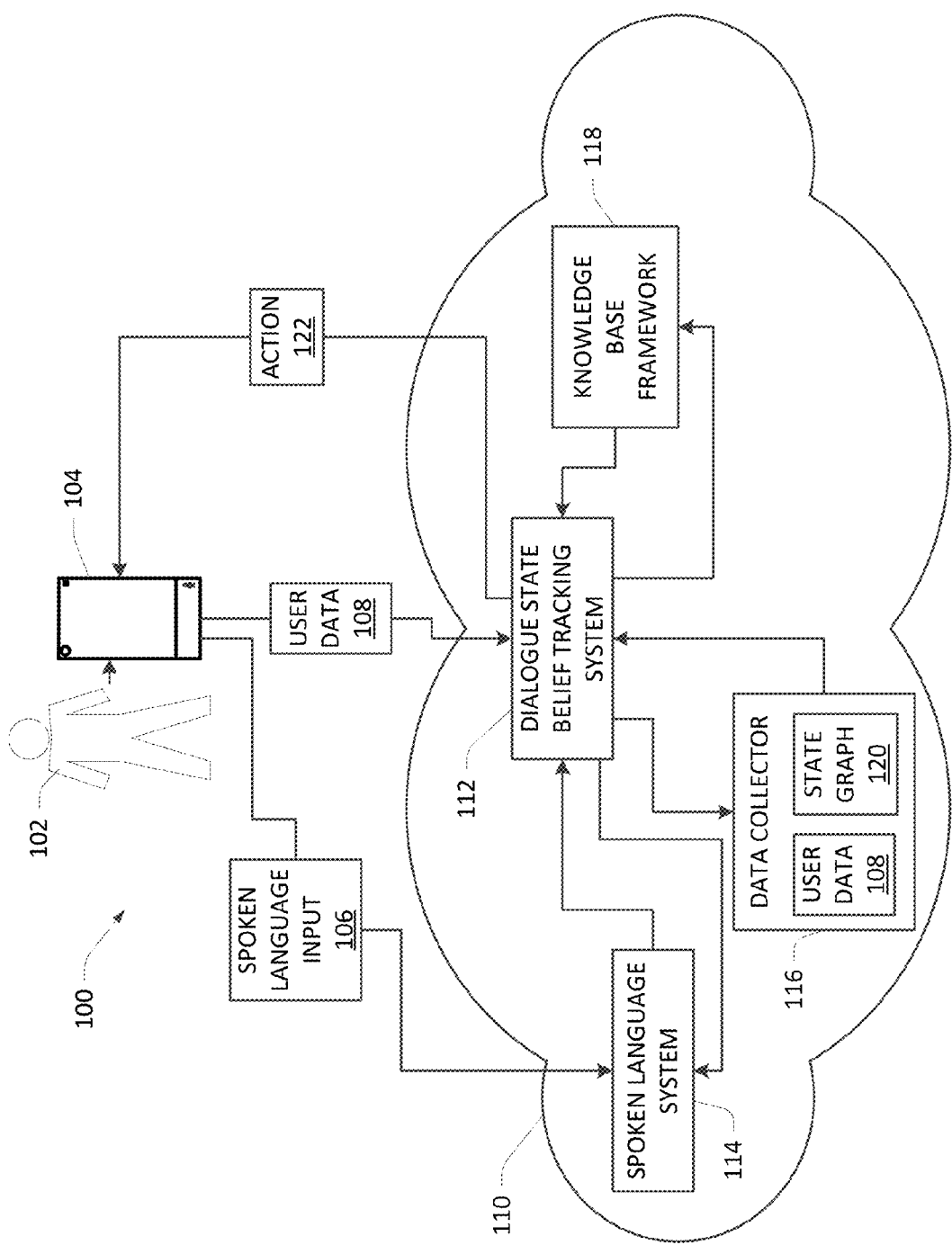
FIG. 1 is a block diagram illustrating an example of a system for controlling a response to a spoken language input.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Various spoken dialogue systems have been developed and designed to provide a machine with the ability to converse with a user. For example, mobile devices currently utilize spoken dialogue systems to interact with users. The interactions include retrieving data, sending messages, responding verbally to a user, and placing phone calls based on received spoken requests or input from a user. However, these currently utilized dialogue systems suffice only to addresses specific task-oriented or specific information retrieval problems in small sized information repositories— these systems fail to perform well on large corpus information repositories. Current dialogue systems are essentially request response systems at their core. In other words, the currently utilized dialogue systems are inherently goal oriented or task oriented request response systems providing a notion of continuity of conversation though each request response pair, but each response is independent of the last response. Other examples of current conversational systems are ones that walk users through a sequence of well-defined and often predetermined decision tree paths, to complete user intent (such as making a dinner reservation, booking a flight etc.)

There is typically no dialogue system that truly engages in conversation with the user over multiple turns that can consistently and effectively infer a user's goal or intent over large multi-domain information repositories even when that goal or intent is not explicitly stated by the user and then perform one or more desired actions based on the determined user goal(s). While previous systems have attempted to infer user intent, these systems lack the accuracy and versatility provided by the systems and methods disclosed herein. For example, in current spoken dialogue systems domain knowledge is being incorporated by (i) including features that represent knowledge results obtained from a database or (ii) explicitly hand coding the knowledge into the design of the dialogue state (e.g. incorporating a manually designed Bayesian graphical model as part of the dialogue state). In applying (i), while a flat vector of features extracted from a number of database queries can aid in resolving ambiguity and uncertainty, these vectors are unlikely to capture all the connections that could be made which relate to the information provided by the user. In applying (ii), it is difficult to update knowledge because newly acquired knowledge requires updating a structure that is at the heart of the dialogue engine and to which many other parts make reference. Thus, the knowledge encoded in Bayesian graphical dialogue state model is often represented at an abstract level so changes in the underlying knowledge do not entail a change to the graphical model. Furthermore, (ii) requires manual design of the graphical model for each new domain.

The systems and method disclosed herein address the issues with (i) and (ii) above by utilizing large multi-domain graphical knowledge frameworks of entities as a core component of the dialogue state. For example, the systems and method disclosed herein map the dialogue state onto existing graphical knowledge frameworks to exploit the full richness of the connections between entities and to infer missing or related information.

Advantageously, the systems and methods described herein represent the dialog state and carry out inference directly over existing large graphical knowledge bases that span multiple domains and build the dialog state graphical model incrementally and automatically using the graphical knowledge frameworks as the skeleton over multiple turns of a conversation. Accordingly, the system and methods disclosed herein avoid manual design of graphical models and picks up underlying knowledge updates as the graphical knowledge bases are updated. Example scenarios that are difficult for the prior art to handle, but are straightforward through the utilizing a graphical knowledge base, are those where multistep inference are required, such as the following verbal request from a user, "Film directed by Rob Marshall and staring that actor from Edward Scissorhands," because the system has to infer the actor is Johnny Depp, that Edward Scissorhands is a movie, and that requested data is the movie Pirates of the Caribbean: On Stranger Tides. Additionally, the systems and methods described herein automatically build and maintain a representation of the dialogue ambiguity/uncertainty over multiple turns. As such, the systems and methods described herein not only determine or infer multiple user intents and engage the user in a conversation similar to human interactions, but do so utilizing a probabilistic model to increase accuracy and relevance to the user. For example, the systems and methods described herein utilize a probabilistic model of a knowledge base framework to a) resolve ambiguities with multiple intents and/or descriptions of the intent; b) maintain the state of active intents and/or entities/attributes describing the intents across multiple exchanges or turns in a conversation with the user, so as to implicitly infer references made by the user that refer to items mentioned earlier in the conversation; c) whenever applicable match a user's preferences; and d) given a failure to understand an user's intent (e.g., either because the intent cannot be found or the confidence score of its best guess is below a threshold), engage in a dialog to understand user intent.

These improvements ensure that the actions performed by the device are relevant to the user. Additionally, the conversation ability of the systems and methods disclose herein prevent the user from having to explicitly state their intent, from only having one intent at a time, or from having to list all subjects by name. As such, the systems and methods disclosed herein improve a user's ability to interact with a device saving the user time and improving the user's ability to accomplish tasks and to get desired information. Additionally, the systems and methods disclosed herein utilize binary probabilities and weighted connections to prevent unwanted data and actions from being presented or performed improving the usability of the device and the user interactions with the device.

FIG. 1 generally illustrates an example of a system 100 for controlling a response to spoken language input 106 and other modal input. The system 100 allows a user 102 to request actions via a spoken language input 106 and other modal input from a user device 104. A user device 104, such as a mobile computer, a gaming system, a desktop computer, a mobile phone, a watch, a personal computer, a smart phone and/or etc., is associated with a user 102. User data 108 is gathered from one or more of these devices 104.

The user device 104 is configured to receive spoken language input 106 and other modal input from a user 102. In some embodiments, the user device 104 receives the spoken language input via a sensor on the device 104, such as a microphone. The spoken language input 106 is verbal communication from the user 102 to the device 104. A spoken language output is verbal communication from the device 104 to the user 102. The user device 104 sends the spoken language input 106 to a spoken language system 114. The spoken language system 114, in the illustrated example, is running on a remote computing system such as a server that is illustrated as running in the "cloud" 110. Although shown as in the cloud 110, those skilled in the art will appreciate that the spoken language system 114 may run locally (e.g., on the device 104) or in other environments as well.

In some embodiments, the user device 104 sends the spoken language input 106 to the spoken language system 114 upon receipt of the spoken language input 106. In other embodiments, a user device 104 is configured to send spoken language input 106 to the spoken language system 114 periodically (e.g., at predefined time intervals such as once per hour), and/or when the device 104 is connected to a wife network. The frequency for transmission of spoken language input 106 from the device 104 to the spoken language system 114 can vary. In some embodiments, predefined rules are established specifying transmission of spoken language input 106 from the device 104 to the spoken language system 114. In alternative embodiments, the spoken language input 106 is sent to the data collector 116 and then the data collector 116 sends the spoken language input 106 to the spoken language system 114. As such, in some embodiments, the data collector 116 stores the spoken language input 106. In other embodiments, the spoken language input 106 is sent to the DSBT system 112 and then the DSBT system 112 sends the spoken language input 106 to the spoken language system 114.

Additionally, the user device 104 is configured to send user data 108 to the dialogue state belief tracking system 112. The user data 108 may include user signals, user information, user feedback, user inferences, and/or any other relevant user data entered by the user or determined by the device 104. In some embodiments, the user data may be gathered from one or more modalities, such as clicks, selection, text, highlighting, gesture, facial expression, eye tracking and other modalities used in communication. For example, if the user device 104 is a gaming system, a natural user interface may interact with the user and gather all of these modalities as user data. In further embodiments, the user device 104 runs a plurality of apps, such as one or more email apps, social networking apps, global positioning system (GPS) apps, calendar apps, weather apps, etc. Interaction between the user 102 and the various apps operating on the device 104 generate "user signals" associated with the user that contain information in various subjects, which can be collected and analyzed. For example, user signals generated by email messages sent and/or received via email apps, social network posts posted and/or read via social network apps, voice recognition of commands, searches submitted via search apps, web sites visited via browser apps, etc. may be evaluated to identify user data 108.

User data 108 also includes information that is directly entered by the user into the one more devices 104, such as a mobile device. In some embodiments, a portion or a turn of the conversation between the user and the device 104 is received from user data instead of from or in addition to spoken language input. User data also includes user feedback. User feedback is information given directly to the device that provides specific preferences of the user. The user feedback may be directly or indirectly solicited by the device 104. For example, the user data 108 may include age, sex, likes, dislikes, credit card information, activity level, food preferences, news preferences, social preferences, and etc. In some embodiments, the user information and user feedback are received by the device 104 via spoken language input 106 and/or other modalities from the user 102. User data 108 also includes user inferences. User inferences are assumptions about the user that can be made based on the user data 108. The inferences may be utilized to determine additional relevant data about the user.

Selected pieces of user data 108, such as user location, user likes, and user dislikes are sent to a dialogue state belief tracking system 112. The dialogue state belief tracking system (DSBT system) 112 may send the user data 108 to a data collector 116 for storage. In alternative embodiments, the user data 108 is sent to the data collector 116 and then the data collector 116 sends the user data to the DSBT system 112. The DSBT system 112 and the data collector 116, in the illustrated example, are running on a remote computing system such as a server that is illustrated as running in the cloud 110. Although shown as in the cloud 110, those skilled in the art will appreciate that the data collector 116 and/or the DSBT system 112 may run locally (e.g., on the device 104) or in other environments as well.

In some embodiments, a user device 104 is configured to send user data 108 to the DSBT system 112 periodically (e.g., at predefined time intervals such as once per hour), and/or when the device 104 is connected to a wifi network. The frequency for transmission of user data 108 from the device 104 to the DSBT system 112 can vary, for instance, based on the type of user data. In some embodiments, predefined rules are established specifying transmission of user data 108 from the device 104 to the DSBT system 112. For example, each time a calendar entry is made or changed, or each time an email is sent or received, the corresponding user data 108 could immediately be sent to the DSBT system 112. Other user data 108 could be sent hourly or daily, or sent each time the device 104 is activated.

The spoken language system 114 receives the spoken language input 106 from the device 104. The spoken language system 114 includes a speech recognition system and a natural language understanding system. The speech recognition system converts the spoken language input 106 into text or into searchable data. The natural language understanding system evaluates the text or searchable data from the speech recognition system and identifies or tags user intents, nouns, adjectives, and other items within the spoken language system 114. In some embodiments, the spoken language system 114 utilizes previously created or stored state graph information and/or user data received through communications with the DSBT system 112 to identify one more tags. For example, in some embodiments, the natural language understanding system may interpret the text "when" to be a request for time and interpret the text "where" to be a request for a location, even though, the user does not specifically state "a time" or "a location." The natural language understanding system understands that this is how the user understands these terms and interprets them accordingly. However, the speech recognition system and the natural language understanding system may often find two viable interpretations and therefore are not always certain about tag determinations/identifications. As such, the natural language understanding system gives weights or confidence levels to the identified items or tags to indicate how likely or how confident (e.g., an accuracy evaluation or indicator) the systems are in the tags and/or text. For example, the speech recognition system may be unsure if a spoken language input references "Woolworths" or "Woolwich." In other embodiments, the natural language understanding system may be unsure if "prince" refers to a listed contact name, the singer, or the royal label. In these instances, each interpretation is evaluated and/or tagged and then weighted. The spoken language system 114 does not resolve the ambiguity and/or uncertainty of the determined tags. Accordingly, in some embodiments, the natural language understanding system creates contradictory and/or alternatively competing tags. The spoken language system 114 sends all of the determined tags, even contradictory tags and/or alternative competing tags and their corresponding confidence levels to the DSBT system 112. While FIG. 1 illustrates a DSBT system 112 separate from the spoken language system 114, in some embodiments, the spoken language system 114 is part of or is included within the DSBT system 112.

Figure 2:
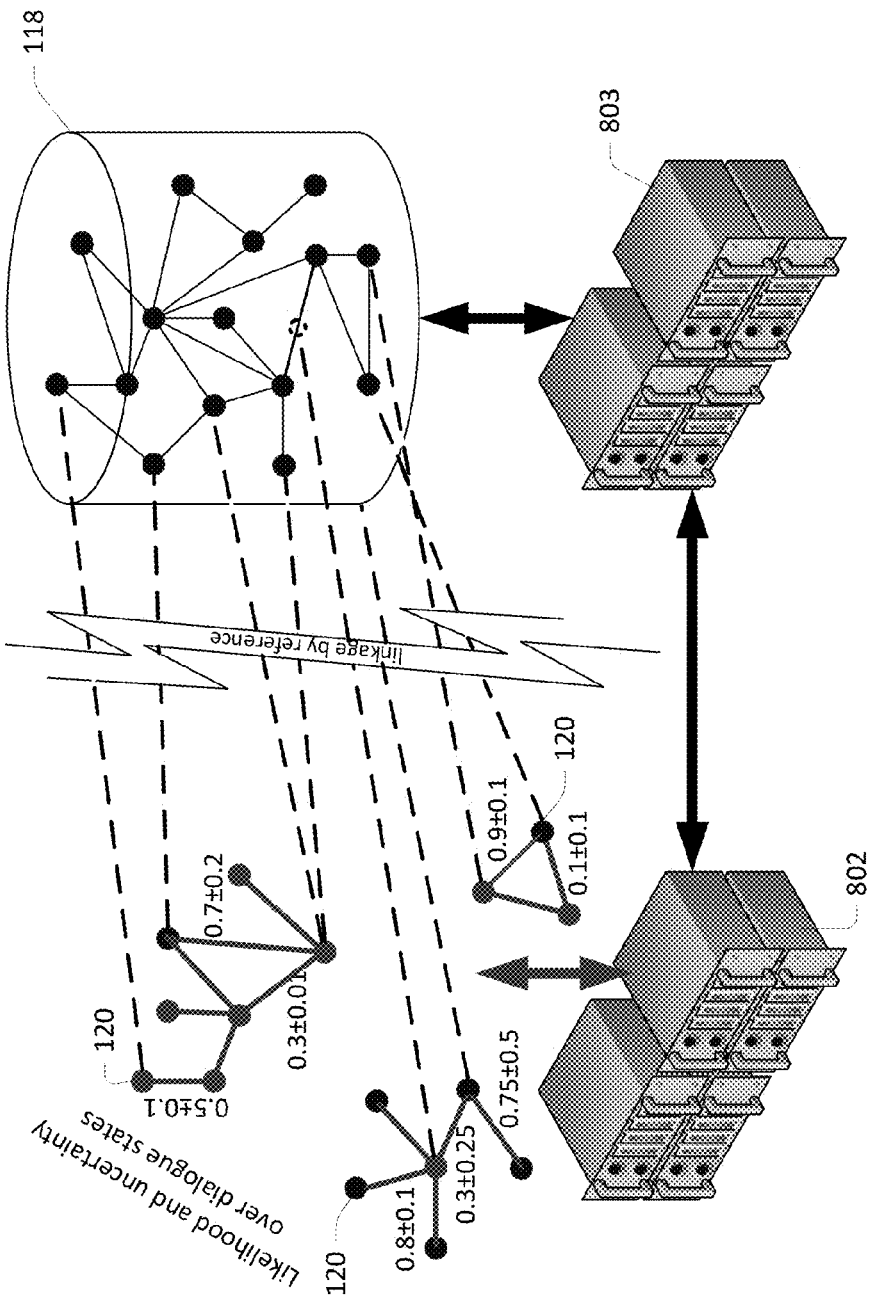
FIG. 2 is a schematic diagram illustrating an example of a portion of a system for responding to a spoken language input.

The DSBT system 112 receives tags from the spoken language system 114. As discussed above, in some embodiments, the DSBT system 112 also receives user data 108 from the device 104. The DSBT system 112 searches a knowledge base framework 118 based on the tags and/or the user data 108. The knowledge base framework 118 is one or more data stores that capture information about entities, attributes, and relationships between entities and/or attributes. Large graphical knowledge base frameworks 118 cover a wide range of domains and have been created to improve relevance in delivering web search results. Example knowledge base frameworks include Freebase, Google's Knowledge Graph, and Microsoft's Satori. The DSBT system 112 searches these and any other existing services that allow large portions or the whole of an existing graphical knowledge base framework 118 to be interacted with on a real time basis. In some embodiments, the user data searched by the DSBT system 112 may vary based on the received user data and the received tags. In further embodiments, the DSBT system 112 selects a portion of the known user data to search in the knowledge base framework 118. In other embodiments, the DSBT system 112 searches for any user data received by the DSBT system 112 in the knowledge base framework 118. FIG. 2 illustrates an example of a server 802 implementing the DSBT system 112 and a search for tags and user data by server 802 of a knowledge base framework 118 implemented via server 803.

The DSBT system 112 matches at least a portion of the tags and/or the user data 108 to the entities, attributes, and relationships in the knowledge base framework. The DSBT system 112 copies the graphing structure (e.g., a skeleton of the graph) of a portion of the knowledge base framework that includes the matches. In some embodiments, the portion of the framework includes interconnecting items (or nodes) that did not match the tags and/or user data but were located between matched tags and/or user data. These interconnected items that did not match any user data or tags are referred to herein as inferred items. In additional embodiments, the portion of the framework may include edge entities (or edge nodes) that did not match the tags and/or user data but were located one or two relationships off of a matched tag and/or user data. In some embodiments, the edge entities may be an attribute, entity, or relationship that relates to, are similar to, or are a type of the searched tags or user data.

Figure 3A:
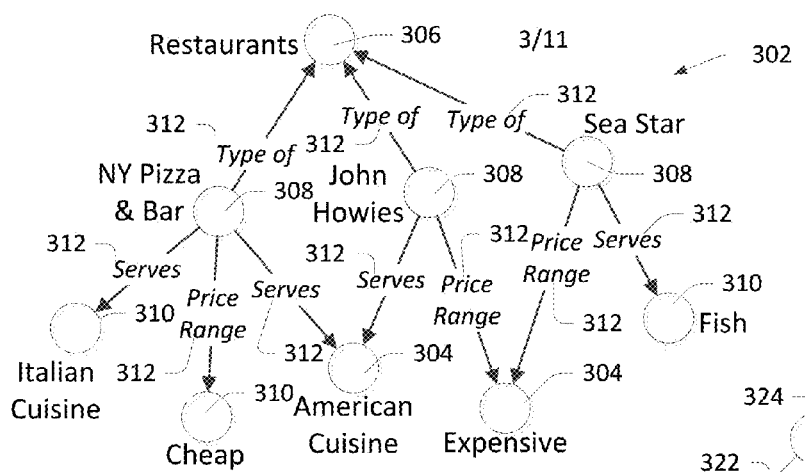
FIG. 3A is a graph illustrating an example portion of a knowledge base framework.

For example, if a device 104 receives the following spoken language input from a user: "I want to find an expensive American restaurant," the device 104 sends this spoken language input 106 to the spoken language system 114. The spoken language system 114 may send the entity of a restaurant and the attributes of expensive and American as tags to the DSBT system 112. The DSBT system 112 searches for the provided tags along with additional user data, such as the location of the device and a list of restaurants frequented by the user, on one or more knowledge base frameworks. Next, the DSBT system copies a portion of the knowledge base framework that matches these tags and user data. For example, FIG. 3A illustrates an example of a portion 302 of the knowledge base framework for these tags and user data. The matched tags and user data are shown on FIG. 3A as matched attributes 304 and matched entities 306. As illustrated in FIG. 3A, several unmatched entities 308 and unmatched attributes 310 were also provided by the portion 302 of the knowledge base graph. Further, the portion 302 provides the relationships 312 between all of the selected entities and attributes.

The DSBT system 112 creates a state graph 120, at least in part, by transforming the graphing structure of the portion of the knowledge base framework 118 into a probabilistic model graph. In some embodiments, the DSBT system 112 transforms the portion of the knowledge base framework 118 into a probabilistic model graph by replacing the relationship provided on the knowledge base framework with weighted connections and by assigning a confidence indicator to each node of the state graph 120. In some embodiments, the state graph 120 is a Markov Random Field (MRF). In further embodiments, the confidence indicator is a probability of a binary variable of the node. For example, each node indicates how likely the node represents the user's goal by being labeled either "on" or "off" In some embodiments, a node is labeled as "off" if the node is assigned a probability of less than 0.5 and the node is labeled as "on" if the node's assigned probability is greater than 0.5. In some embodiments, the assigned probabilities and the weighted connections are at least based in part on the confidence levels provided by the spoken language system 114. Additionally, the DSBT system 112 defines potential functions over the nodes and the connections in the state graph. In some embodiments, the weighted connections have probabilistic relationships that do not align (do not have a 1 to 1 correspondence) with the relationships of the knowledge base framework 118 and have to be represented in the probabilistic model graph via a separate function. For example, FIG. 3C illustrates a state graph 320 that identifies these separate functions 326.

In some embodiments, the weights for the state graph are general mathematical functions and are not singular values. For example, the weight on an edge in a state graph may be specified as matrix of values that encodes the co-variance between the states of the connected nodes. These "weight" functions can be set-up and/or updated to not only to reflect the original graph structure but to also encode additional information, such as the strength of relationships observed in other auxiliary data, e.g. collated logs of users interacting with the system or, alternatively, user preferences (explicitly expressed or inferred). The weights may be manually/programmatically predetermined to encode desired relationships, or their values could be computed using standard graph optimization techniques that compute weight values which maximize some objective function.

Further, the DSBT system 112 may create a state graph by adding evidence nodes 328 with a confidence indicator and a weighted connection for each matched tag and/or user data to the matched entity on the knowledge base framework. In some embodiments, DSBT system 112 creates a state graph by adding nodes with a confidence indicator and a weighted connection for each unmatched tag and/or user data to the probabilistic model graph. In further embodiments, user preferences, likes, and/or dislikes are utilized to change the weighting of the connection and/or the nodes. In some embodiments, user like and/or preferences will be labeled as "on", while user dislikes will be labeled as "off" when added to the state graph.

Figure 3B:
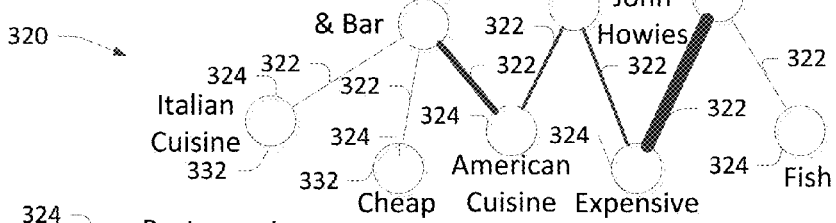
FIGS. 3B-3D illustrate different example state graphs based on the portion of the knowledge base framework shown in FIG. 3A.
Figure 3C:
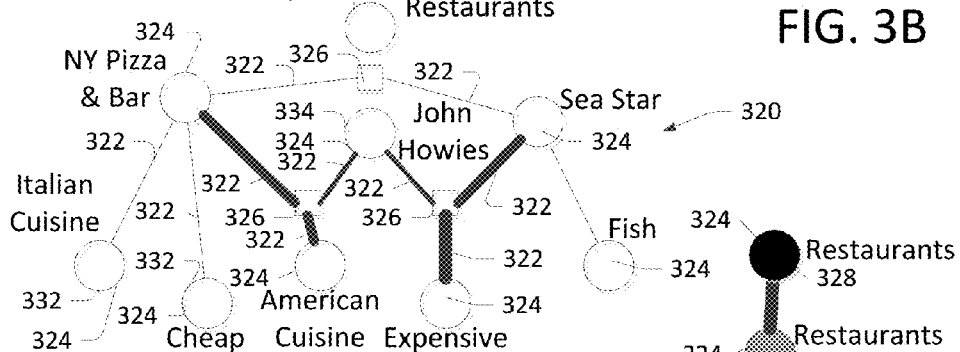
Figure 3D:
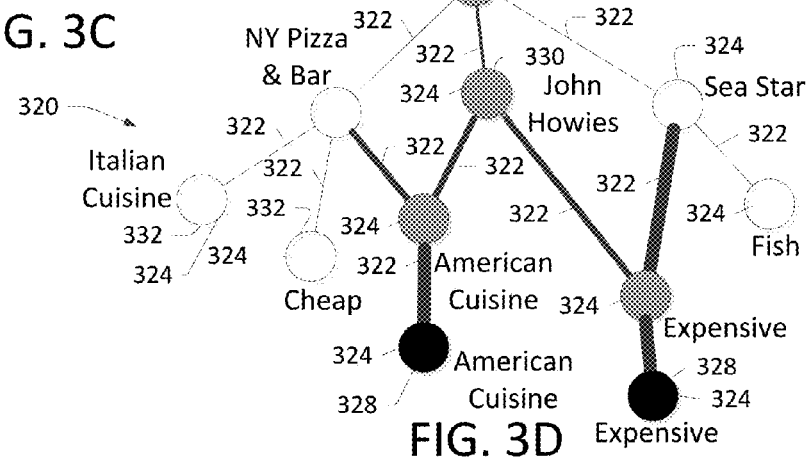

FIGS. 3B, 3C, and 3D illustrate different example state graphs 320 based on the transformation of example portion 302 of the knowledge base framework illustrated in FIG. 3A. All of the state graphs 320 have replaced the relationships 312 with weighted connections 322. Further, the strength of the weighted connections 322 are illustrated by varying the thickness of the lines. In these examples, the stronger the connection the thicker the line and the weaker the connection, the thinner the line. While not shown in the state graphs 320, each node 324 of the state graph 320 has an assigned confidence indicator, such as a probability of a binary variable. However, nodes 324 that have a probability above 0.5 or that are labeled "on" are shaded in FIG. 3D. The darker the shading of the nodes 324, the larger the probability of the node. The unshaded nodes have a probability of less than 0.5 and are therefore, labeled as "off" The state graph 320 illustrated in FIG. 3D includes added tags as evidence nodes 328. FIGS. 3B and 3D illustrate state graphs 320 with weighted connections that have a 1 to 1 correspondence. FIG. 3C illustrates a state graph 320 with weighted connections that do not have a 1 to 1 correspondence and therefore provide a factor portion 326 within the weighted connections 322. FIGS. 3B, 3C, and 3D further show edge nodes 332.

The DSBT system 112 utilizes the created state graph to determine one more user goals. The DSBT system 112 does not require hand coding or manually design of the state graph. Further, the DSBT system 112 does not utilize the state graph to determine how accurate the identification of tags is within each turn of the conversation. In contrast, the DSBT system 112 may utilize the confidence levels of the tags to adjust the node probabilities of the state graph. The DSBT system 112 determines the user goal by analyzing the weighted connections, rankings and/or probabilities within the state graph. As such, the DSBT system 112 may determine multiple intents that lead to one or more user goals. In some embodiments, the DSBT system 112 ranks or sorts the nodes based on their weighted connections and/or confidence indicators and then selects the top ranked node or nodes as the user's goal(s). For example, in some embodiments, the DSBT system 112 ranks the nodes based on their likelihood of being "on." In some embodiments, an inferred item, while not matched to a tag or user data may be the determined user goal based on the weighted connections, confidence indicator, and/or the rankings. For example, FIG. 3D shows that the inferred item 330 of John Howies (which was not matched to a tag or user data) is "on" and is located at the center of all of the "on" nodes. As such, in the embodiment illustrated in FIG. 3D, John Howies may be selected as the user goal by the DSBT system 112. Alternatively, the user data could include that John Howies is often frequented by the user and therefore the John Howies node is a matched user data node 334 and given a high confidence indicator in the state graph based on this known user preference as illustrated in FIG. 3C. In other embodiments, user data, such as the user location (e.g., the location of the device 104) could be driving the selection of the provided restaurants from the knowledge base framework.

In other embodiments, nodes 324 may include intents. As discussed above, user intents determined by the spoken language system are sent to the DSBT system 112 as tags. As such, these intents are searched for and sometimes matched to items within the knowledge base framework. If a tag, such as an intent, is not found within the knowledge base framework, the DSBT system 112 may add this tag to a state graph with a confidence indicator and a weighted connection where most appropriate.

Figures 4A, 4B:
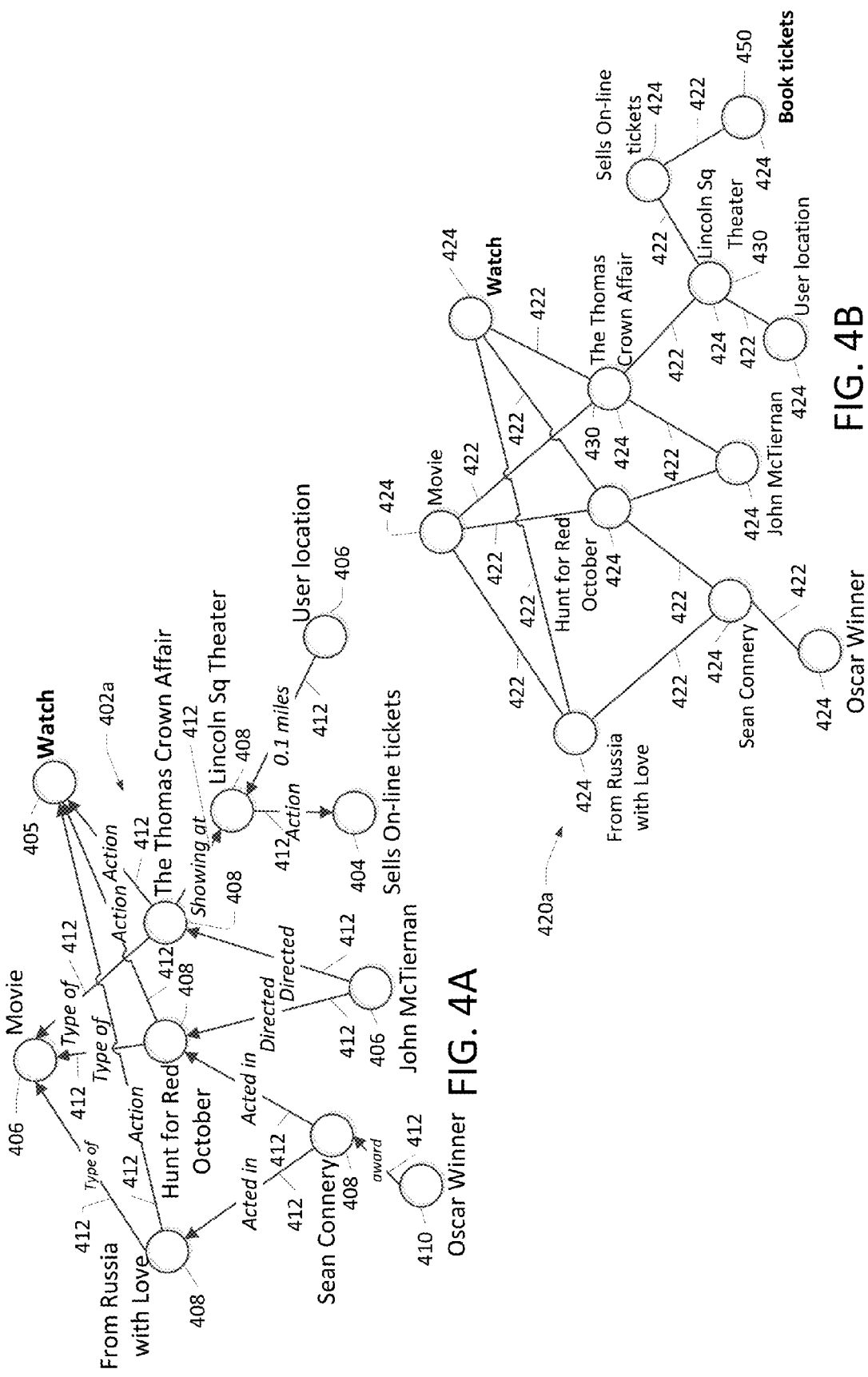
FIG. 4A is a graph illustrating an example portion of a knowledge base framework.
FIG. 4B illustrates an example state graph based on the portion of the knowledge base framework shown in FIG. 4A.

For example, if the spoken language system 114 receives a spoken language input 106 of, "Book tickets to watch the movie directed by John McTiernan at the nearby theater," the DSBT system 112 may receive the following tags from the spoken language system 114: book tickets, watch, movie, director, John McTiernan, theater, location. In this example, the DSBT system 112 identifies a portion 402*a* of a knowledge base framework based on the above received tags that includes entities 406 and attributes 404, and intents 405 that match received tags and user data, unmatched entities 408, unmatched attributes 410, and their relationships 412, as illustrated in FIG. 4A. In this embodiment, the intent tag "watch" is matched to the knowledge base framework. However, the intent tag "book tickets" is not matched to the knowledge base framework. The DSBT system 112 creates a state graph based on the portion 402*a* in FIG. 4A to form the state graph 420*a* illustrated in FIG. 4B. The state graph transformed the portion 402*a* by replacing the relationships 412 with weighted connections 422 and by adding or clamping on the missing intent tag "book tickets" as an intent node 450 to the state graph 420*a* at a logical location. While not shown, the state graph 420*a* displayed in FIG. 4B includes confidence indicators for each node 424 and weighted connections 422 between the nodes 424. Additionally, as illustrated by FIGS. 4A and 4B, the movie Thomas Crown Affair and the Lincoln Square Theater were not specifically spoken by the user, even though they were the user's intent. The DSBT system 112, in this embodiment, infers the user's intent regarding the Thomas Crown Affair and the Lincoln Square Theater based on the weighted connections and/or the confidence indicators of the interconnected nodes 430 that are not matched to the tags or user data (e.g. user location).

The DSBT system 112 updates a created state graph through multiple turns of a conversation with the user and/or in response to new or additional user data. For example, when the DSBT system 112 receives new or additional tags or user data, the DSBT system 112 performs another search of the knowledge base framework 118 on a real time basis or as DSBT system 112 receives additional tags and user data. The DSBT system 112 matches at least a portion of the additional tags and/or the user data 108 to the entities, attributes, and relationships in the knowledge base framework. The DSBT system 112 copies or retrieves a portion of the knowledge base framework that matched the additional tags and user data. Next, the DSBT system 112 determines if any entities or attributes of the portion of the knowledge base framework align with nodes on the previously created state graph. If any entities or attributes align, the new portion of the knowledge base framework is clamped on based on these aligned features and transformed into the probabilistic model graph to form an updated state graph. If no entities or attributes align, the DSBT system 112 may transform the new portion of the knowledge base framework into a second state graph and maintain this second state graph separately form the first state graph. In some embodiments, if searched tags and/or user data return two separate sections of a knowledge base framework that do not connect, the DSBT system 112 may copy each separate section in the portion of the knowledge base framework and transform both sections of the knowledge base framework into two separate state graphs and maintain both state graphs separately unless subsequent searches link the two separate state graphs together. Accordingly, the DSBT system 112 is versatile and can change to new topics easily within a conversation with the user because the DSBT system 112 can maintain and update separate state graphs simultaneously to arrive at one or more user goals. For example, FIG. 2 illustrates three separate state graphs 120 that are all being maintained and updated by the DSBT system 112 implemented by the server 802. Additionally, the state graphs 120 shown in FIG. 2 list a few confidence indicators for the illustrated nodes. Further, several of the nodes on the state graph 120 are not based on matched or inferred items from the knowledge base framework 118, as illustrated FIG. 2.

Further, the knowledge base frameworks 118 and the state graphs are created and maintained separate from each other. As such, the knowledge base frameworks 118 and any created state graph 120 may be updated independently and separately from each other. The separation between the state graphs 120 and the knowledge base framework 118 create a more versatile system that can more easily adapt as relationships change, as user data changes, and/or as spoken language inputs change.

The DSBT system 112 utilizes the updated state graph to determine one or more user goals. The DSBT system 112 determines one or more user goals by analyzing the weighted connections, confidence indicators (e.g., probabilities within the updated state graph), and/or rankings of the nodes. As such, the DSBT system 112 may determine multiple intents that lead to one or more user goals. In some embodiments, the DSBT system 112 ranks or sorts the nodes of the updated state graph based on their likelihood of being "on" and then selects one or more top ranked nodes as the one or more user's goal(s).

The DSBT system 112 may send any created state graph to the data collector 116 for storage. The DSBT system 112 may send any created state graph 120 and/or user data 108 to a data collector 116 for storage periodically (e.g., at predefined time intervals such as once per hour), and/or when the device 104 is connected to a wife network. The frequency for transmission of a state graph 120 and/or user data 108 from the DSBT system 112 to the data collector 116 can vary. In some embodiments, predefined rules are established specifying transmission of a state graph 120 and/or user data 108 from the DSBT system 112 to the data collector 116. In further embodiments, if a state graph is not utilized after a predetermined amount of time or after a predetermine number of turns in a conversation, the state graph 120 may be deleted by the DSBT system 112 and/or the data collector 116. In some embodiments, the deletion of a state graph indicates the end of a conversation or a change in topic in conversation between the user and the device. In other embodiments, a state graph 120 created by the DSBT system 112 based on user likes, preferences, and/or dislikes is always maintained and stored within the data collector 116 for updating.

The DSBT system 112 sends an action (or instructions to perform an action) to the device based at least on the one more user goals. In some embodiments, the DSBT system 112 sends instructions to provide the user goal. In some embodiments, providing the use goal entails performing a requested action, providing the user with requested data, and/or changing a setting on the device. In additional embodiments, a spoken response and/or other modality response is generated by the device in addition to the performance of the action based on instructions from the DSBT system 112 to inform the user of the performed action and/or to maintain a conversation with the user 102. In additional embodiments, any data provided to the user is provided to the user via a spoken language output generated by the device. In other embodiments, the provided data may be displayed or listed by the device 104. In other embodiment, the DSBT system 112 sends instructions to request additional data (also known as user feedback) from the user. In some embodiments, the request for user feedback may be provided to the user in a spoken language output generated by the device 104. In other embodiments, the request for user feedback may be displayed or listed by the device 104. The action sent to the device 104 may vary based on the confidence indicator and the weighted connections.

For example, in some embodiments, the DSBT system 112 compares the weighted connections and/or the confidence indicator of a determined goal to a confidence threshold. If the weighted connections and/or the confidence indicator of a determined goal do not meet the confidence threshold, the DSBT system 112 may send instructions to request additional user feedback in order to determine the user goal. If the weighted connections and/or the confidence indicator of a determined goal meet the confidence threshold, the DSBT system 112 sends instructions to perform the determined user goal.

Table 1 listed below provides an example of a user conversation with a device utilizing a DSBT system through multiple turns. The conversation illustrated in Table 1 provides an example of how the DSBT system 112 responds to multiple user intents that are not explicitly listed through multiple turns of a conversation.

TABLE 1

Example conversation between user and a device utilizing a DSBT system.

| Turn | Automatic Speech Recognition Input or Output | Intent inference and/or user goals determined by the DSBT system; and Uncertainty/Ambiguity encountered by the DSBT system | Instructions/ Actions |
|---|---|---|---|
| User $1^{st}$ turn | "book tickets to watch the movie directed by John McTiernan at the nearby theater" | Intent Inference: movie is "Thomas Crown Affair," and theater is the Lincoln Square Theater Goal: book movie tickets for this movie from the Lincoln square theater Ambiguity: Tickets for what day and time. Does not meet confidence threshold | Send instructions for user feedback. |
| System $1^{st}$ turn | "what day and time" | Attempted disambiguation based on known uncertainty | |
| User $2^{nd}$ turn | "tomorrow for a showing around 7" | Intent Inference: movie is "Thomas Crown Affair," theater is the Lincoln Square Theater, 7:20 showing on Nov. $1^{st}$. Goal: book movie tickets for this movie from the Lincoln Square Theater for the 7:20 showing on Nov. 1. Ambiguity: none - meet confidence threshold | Send instructions to book tickets and to inform the user of the purchase |
| System $2^{nd}$ turn | "Booked tickets with your saved credit card and emailed you the booked tickets" | Attempt user goal. | |
| User $3^{rd}$ turn | Is there free parking | Intent Inference: theater is the Lincoln Square Theater, request for parking fees. Goal: Cost to park at Lincoln Square Theater Ambiguity: none - meet confidence threshold | Send instructions regarding requested data |
| System $3^{rd}$ turn | "The Diamond Parking Lot costs $5 with validation." | Attempted user goal | |

As illustrated above, the DSBT system 112 does not require the user to explicitly state his or her intents and may infer multiple user intents to determine the user's goal. For example, the DSBT system 112 during the $1^{st}$ turn of the user infers that the referenced movie is the Thomas Crown Affair and the nearby theater is the Lincoln Square Theater as discussed above with reference to FIGS. 4A and 4B. Based on these inferred intents, that the user's goal to book tickets to this inferred movie at this inferred theater is determined by the DSBT system 112.

If the DSBT system 112 was uncertain about which theater the user was referencing in the $1^{st}$ turn of the conversation based on the user's location, the DSBT system may incorporate the user's location and the list of possible theaters into the state graph. For example, a single node representing the user's location (or multiple nodes representing the user's location for each possible theater) and then add weighted connections that are proportional to the distance of each theater from the location of the user may be utilized to determine the desired theater via the state graph.

The DSBT system 112 determines that the system 112 does not have enough information to book the tickets and therefore sends instruction to request user feedback to clarify the known ambiguity about the determined user goal. The DSBT system 112 may determine the ambiguity because several days and times for viewing the show are present on the determined state graph, but none of the listed times meet the necessary confidence threshold. Accordingly, in some embodiments, the ambiguity of the user's goals (or the need for additional information) was determined because the determined user goal did not meet a confidence threshold. The instructions provide a spoken language request for more data at the $1^{st}$ turn of the system. The user during a second turn responds with the requested information via a second spoken language input as illustrated by the User $2^{nd}$ Turn in Table 1 above.

In response to the second spoken language input in the conversation illustrated in Table 1 above, the device 104 sends the received second spoken language input to the spoken language system 114. The spoken language system 114 determines one or more tags in view of the previous state of the dialogue (e.g., previously determined tags, inferred intents, user goals, matched entities, matched attributes, identified relationships, user data, and etc.). Accordingly, the spoken language system 114 and the DSBT system 112 communicate with each other when they are separate modules and distinct from each other. In some embodiments, however, the spoken language system 114 is part of the DSBT system 112.

In this example, the spoken language input determines the following tags in view of the previous determined tags and intent inferences: Lincoln Square Theater, book tickets, Thomas Crown Affair, November $1^{st}$, near 7 pm. These determined tags are sent to the DSBT system 112, which searches one or more knowledge base frameworks 118 and matches these tags to one or more entities, attributes, and/or relationship within the knowledge base framework 118. The DSBT system 112 copies/retrieves and saves a portion the framework that includes the matched tags and any interconnected unmatched nodes. The DSBT system 112 determines if this new portion of the knowledge base framework has any nodes in common with the previously created state graph as illustrated in FIG. 4B. The DSBT system 112 clamps the new portion of the knowledge base framework on to the previously created state graph by aligning the common nodes. Once the state graph and the new portion are aligned, the DSBT system 112 transforms the combined graph into a probabilistic model graph to form the updated state graph. As discussed above, if the state graph and the new portion do not align, the state graph is updated by creating a second separate state graph maintained in addition to the previously created state graph. In this example, the state graph and the new portion align. Next, the DSBT system 112, in this example embodiment, ranks the confidence indicators assigned to each node of the updated state graph. The DSBT system determines that the user goal is to book tickets for the Thomas Crown Affair for the 7:20 showing on November 1 based on the rankings of the nodes. Because the determined goal (including the confidence indicator) meets a predetermined confidence threshold, the DSBT system 112 sends instructions to perform this goal and to notify the user as illustrated in System $2^{nd}$ Turn shown in Table 1 above. In some embodiments, the inferred tags Lincoln Square Theater and Thomas Crown Affair from the $1^{st}$ spoken input are not re-provided by the spoken language system to DSBT system but instead are incorporated directly from the previous turn state graph through, for example, re-use of the $1^{st}$ turn state graph as the basis of the $2^{nd}$ turn graph, or through alignment of the 1st and $2^{nd}$ turn graphs.

The user during a third turn responds to the booked tickets with another spoken language input as show above as the User 3rd Turn in Table 1. In response to the third spoken language input in this conversation, the device 104 sends the received third spoken language input to the spoken language system 114. The spoken language system 114 determines one or more tags in view of the previous state of the dialogue (e.g., previously determined tags, inferred intents, user goals, matched entities, matched attributes, identified relationships, user data, and etc.). In this example, the spoken language system 114 may determine the following tags in view of the previous determined tags and intent inferences: Lincoln Square Theater, parking, and parking cost.

Next, in this example embodiment, these determined tags are sent to the DSBT system 112, which searches one or more knowledge base frameworks 118 and matches these tags to one or more entities, attributes, and/or relationship within the knowledge base framework 118. The DSBT system 112 copies or retrieves and saves a third portion 402b of the framework that includes the matched tags and any interconnected unmatched nodes as illustrated in FIG. 4C. Next, the DSBT system 112 determines if this new portion 402b of the knowledge base framework has any entities or attributes in common with nodes 324 on the previously created state graph. For simplified example purposes, we will assume that the previously created state graph is the state graph 420a illustrated in FIG. 4B instead of the graph that includes the movie date and time nodes from the previous turn. The DSBT system 112 clamps the new portion 402b onto the previously created state graph 420a illustrated in FIG. 4B by aligning the common nodes. For example, the Lincoln Square Theater entity of the portion 402b aligns with Lincoln Square Theater node of the state graph 420a, so the DSBT system aligned these common nodes to form a combined graph. Next, in this example embodiment, the DSBT system 112 transforms the combined graph into a probabilistic model graph by replacing the relationships 412 with weighted connections 422 to form the updated state graph 420b, as illustrated in FIG. 4D. The DSBT system 112 then ranks the confidence indicators assigned to each node 424 of the updated state graph 420b to determine that the user's goal is Diamond Parking Lot price with Validation. The DSBT system 112 sends instructions to perform this goal, as illustrated in the System Third Turn of the conversation in Table 1 above, because the determined goal (including the confidence indicator) meets a predetermined confidence threshold.

The dialogue state and beliefs within the conversation illustrated above in Table 1 are tracked by the DSBT system by maintaining and updating the state graph through each turn and by referencing the state graph during the identification of new tags. Further, if a new conversation topic is started by the user, the DSBT system can smoothly and quickly transition to this new topic. For example, the new topic will most likely return a portion of a knowledge base framework that does not align with any node of the already formed state graph. In these embodiments, the new portion is converted into its own state graph separate from the previous graph and analyzed to determine a user goal by the DSBT system 112 without having to redesign or recreate any previously determined state graphs. As discussed above, if any stored state graph is not utilized by the DSBT system 112 after a predetermined amount of time or predetermined number of turns, the DSBT system 112 may send the state graph to the data collector 116 for storage or may delete the state graph. Further, the use of multiple state graphs also allows the DSBT system 112 to jump between multiple topics within a given conversation with the user by simply maintaining and updating separate state graphs simultaneously. As such, system 100 prevents the user from having to explicitly state each intent and desired goal while still receiving the desired goal from the device thereby improving a user's ability to accomplish tasks, perform commands, and get desired products and/or services. Additionally, system 100 improves the device's responses to spoken language inputs from a user and thereby improves a user's interactions with the device.

Figure 5A:
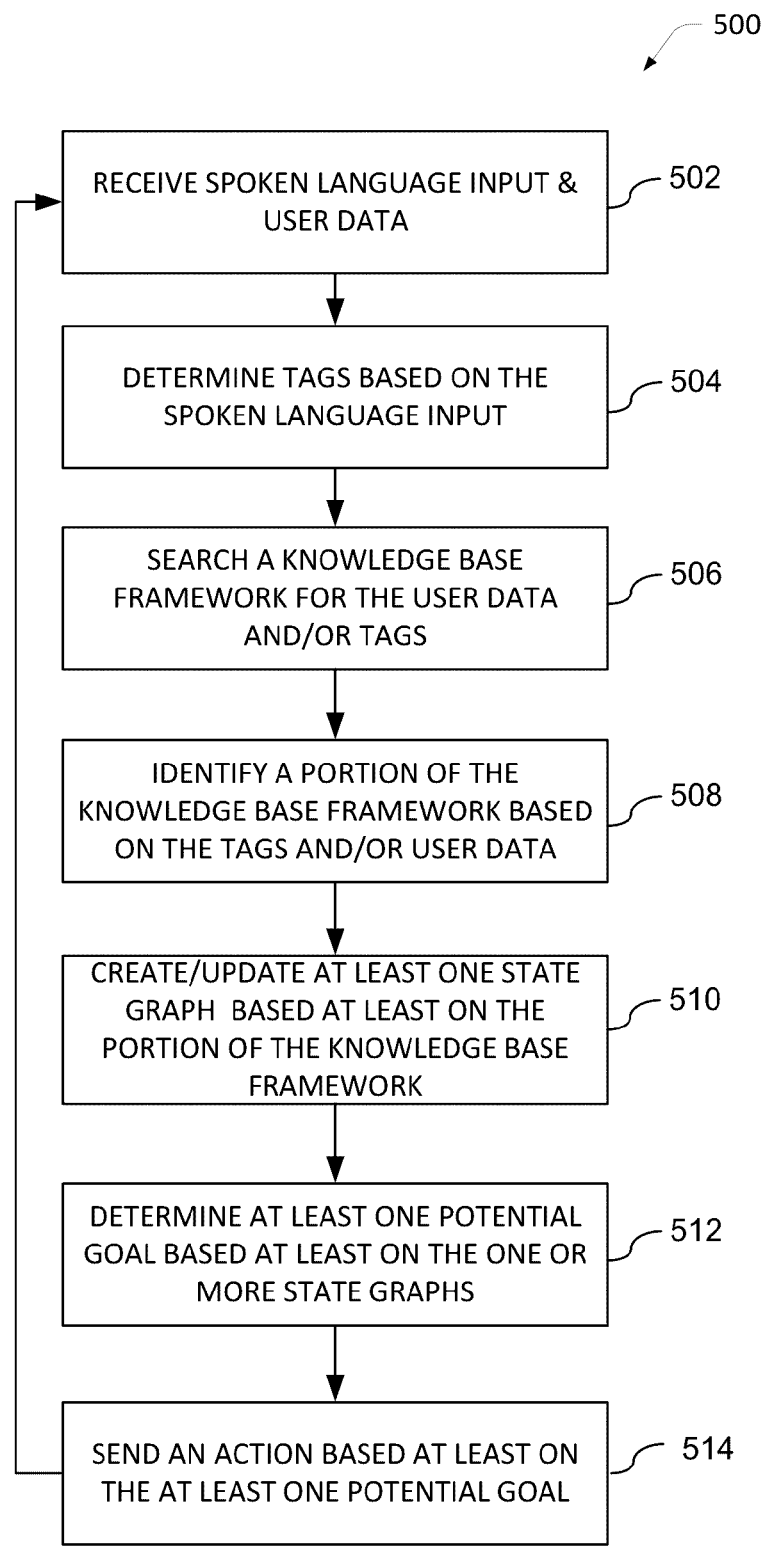
FIG. 5A is a flow diagram illustrating an example of a method for responding to a spoken language input.

FIG. 5 is a flow diagram conceptually illustrating an example of a method 500 for responding to spoken language input. In some embodiments, method 500 is performed by a DSBT system that includes a spoken language system. In other embodiments, method 500 is performed by a DSBT system and a separate spoken language system. In further embodiments, method 500 is performed by a computing device, a mobile computing device, or via a network of remote servers and/or remote computing devices.

At operation 502, a spoken language input and/or user data is received. The user data includes any relevant user data (e.g., user information, user signals, user location, user inferences, and/or etc.). As noted above, user data and/or spoken language inputs may be generated from user interactions with the device and the apps running on the device. In some embodiments, user data is sent from the device to the DSBT system or to the data collector at various times, such as upon receipt, at predefined time intervals or when the device is connected to a wifi network during operation 502. Further, as discussed above, in some embodiments, the spoken language system receives one or more spoken language inputs from the device as soon as the device receives the spoken language input during operation 502. In other embodiments, the spoken language system receives one or more spoken language inputs from the device at various times, such as predefined time intervals or when the device is connected to a wifi network during operation 502.

In additional embodiments, additional user data is received or collected at operation 502. The additional user information is information entered by and/or about the user that is received or collected after previously received user data. In some embodiments, the user data (initial and/or additional) includes user feedback. In some embodiments, initial user data is a first set of data received or collected by the DSBT system during operation 502. In some embodiments, user data is continuously monitored, received, and/or collected at operation 502. In further embodiments, additional spoken language inputs are received or collected at operation 502. The additional spoken language input is any additional spoken language input received or collected by the spoken language system after an initial or previous spoken language input is received. In some embodiments, initial spoken language input is a first spoken language input received or collected by the DSBT system or data collector during operation 502. In some embodiments, a plurality of spoken language inputs are each a turn of a new conversations between the user and the device during operation 502. As such, in other embodiments, an initial spoken language input is a first spoken language input received as part of a conversation by the DSBT system or data collector during operation 502. In further embodiments, the spoken language input (initial and/or additional) includes user feedback. In other embodiments, user data may be one or more turns in a conversation between the user and the device during operation 502.

Examples of various user data associated with a user of a device may include any information entered by the user, membership signals (e.g., a gym membership may be used to identify a workout location for the user; a movie club membership may be used to identify a preferred movie theater and/or coupons for the user; etc.), social network signals (e.g., an "I signed up for a marathon" post may be used to identify an interest in fitness or running; a "lets meet for dinner" message may be used to identify a preferred dining location or cuisine; etc.), device context signals (e.g., connectivity state and/or location may be used to determine wake or sleep times; user data such as email messages and task lists may be used to determine planned future activities and locations; etc.), real-time data signals (e.g., gym hours; traffic conditions to estimate travel times; a closing of a coffee shop that the user routinely visits on Saturday; etc.), activity data signals (e.g., a preferred stop for coffee before work may be identified based upon device locations of the device corresponding to early morning times; children's after school activities may be identified based upon device locations of the device corresponding to a soccer field at late afternoon times; etc.), calendar signals (e.g., meetings, appointments, etc.) and/or etc. Further, the spoken language input may include an action request, a data request, a setting command, and/or etc.

At operation 504 one or more tags are identified from the received spoken language input. The identified tags may be given a confidence level at operation 504. The confidence level indicates how likely the tag is correct or accurate. In some instances during operation 504, contradictory and/or ambiguous tags are determined from the spoken language input. Each interpretation is evaluated, weighted, and then tagged during operation 504. The ambiguity and/or uncertainty of the determined tags are not resolved during operation 504.

In some embodiments, a spoken language system identifies the one or more tags from within the received spoken language input during operation 504. In some embodiments during operation 504, the spoken language input is converted into text by a speech recognition system and then tags are identified from the text by a natural language understanding system. In some embodiments, user data and previously created state graph information are referenced to determine/identify one or more tags from a received spoken language input. In some embodiments, the DSBT system receives one or more tags from the spoken language system as the tags are identified. In other embodiments, the DSBT system receives one or more tags from the spoken language system at various times, such as predefined time intervals or when the device is connected to a wifi network during operation 504. In other embodiments, the DSBT system identifies tags within the received spoken language input during operation 504. In some embodiments, the identified tags are stored by the data collector during operation 504.

One or more knowledge base frameworks are searched based on the identified tags and/or the user data at operation 506. As discussed above, the knowledge base framework is a database that includes a plurality of entities, attributes, and relationships of the entities and attributes to each other. Large graphical knowledge base frameworks cover a wide range of domains and have been created to improve relevance in delivering web search results and allow for real time interactions. In some embodiments, the DSBT system searches one or more knowledge base frameworks during operation 506.

A portion of the knowledge base framework is identified based on the tags and/or the user data during operation 508. The portion includes at least one entity (including user intents) or attribute that matches one or more of the tags and/or the user data. In some embodiments, interconnected entities and/or edge attributes that do not match the tags and/or user data are identified during operation 508. As such, the portion may include the unmatched interconnected entities or attributes (also referred to as inferred items) and/or edge attributes and/or entities. Additionally, the portion of the knowledge base framework may include two separate sections of one or more knowledge base frameworks that match one or more tags and/or user data but do not connect to each other. During operation 508, the identified portion of the knowledge base framework (or a skeleton of the graph of the portion) is copied, retrieved and/or stored.

At least one state graph is created and/or updated based, at least in part, on the identified portion of the knowledge base framework at operation 510. In some embodiments, the state graph is created, at least in part, by transforming the portion of the knowledge base framework into a probabilistic model graph by replacing the identified relationships with weighted connections and by assigning a confidence indicator to each node of the state graph at operation 510. In further embodiments, the tags are clamped on to their corresponding matched entity or attribute via a weighted connection to the probabilistic model graph as evidence nodes with their own confidence indictors at operation 510. In some embodiments, the weighted connections do not have a one to one correspondence with the relationships and these functions are represented or determined in the state graph. For example, FIG. 3C illustrates a state graph 320 where these functions 326 are shown. In some embodiments, the state graph is a Markov Random Field (MRF). In further embodiments, the confidence indicator of each node indicates how likely the node represents the user goal by being labeled either "on" or "off" at operation 510. In some embodiments, a node is labeled as "off" if the nodes is assigned a probability of less than 0.5 and the node is labeled as "on" if the node's assigned probability is greater than 0.5. However, other probability thresholds may be utilized to label the nodes as "on" or "off" as would be known by a person of skill in the art. In some embodiments, the confidence levels of the tags identified at operation 502 are evaluated to determine, at least in part, the assigned probabilities and the weighted connections. In some embodiments, where two separate sections of a knowledge base framework are included in the portion, two separate state graphs are created based on the separate sections of the knowledge base framework at operation 510. In some embodiments, the one or more created state graphs are stored during operation 510.

In some embodiments, at operation 510 a created state graph is updated through multiple turns of a conversation with the user and/or in response to new or additional user data. In these embodiments, the entities and the attributes included in the portion of the knowledge base framework identified from new tags or user data are aligned with matching nodes in any already created state graph. If any entities or attributes align, the new portion of the knowledge base framework is clamped on based on these aligned features and transformed into the probabilistic model graph to form an updated state graph at operation 510. In some embodiments, two separate state graphs may be separately updated and/or linked together based on the alignment of the additional portion of the knowledge base framework. If no entities or attributes align, the new portion of the knowledge base framework may be transformed into a second state graph and maintained separately form the first state graph at operation 510. In further embodiments, if a state graph is not updated after a predetermined amount of time or after a predetermine number of turns in a conversation, this previously created state graph may be deleted at operation 510. In some embodiments, the deletion of a state graph indicates the end of a conversation or a change in topic in conversation between the user and the device. In other embodiments, the creation of new or an additional state graph indicates the end of one conversation and beginning of new conversation with a new topic between the user and the device. In further embodiments, if a state graph is not updated after a predetermined amount of time or after a predetermine number of turns in a conversation, operation 510 determines that this conversation between the user and the device has ended. In other embodiments, a previously created state graph based on user likes, preferences, and/or dislikes is always maintained, stored, and/or updated at operation 510.

At operation 512 at least one user goal is determined based on the created state graph. In some embodiments, the user goal is determined based on one or more state graphs, weighted connections, and/or confidence indicators at operation 512. In additional embodiments, each node of the created state graph is ranked based on the weighted connections and/or confidence indicators at operation 512. In these embodiments, the top ranked nodes are most likely the user goal and one or more of these nodes are selected to determine one or more user goals.

Figure 5B:
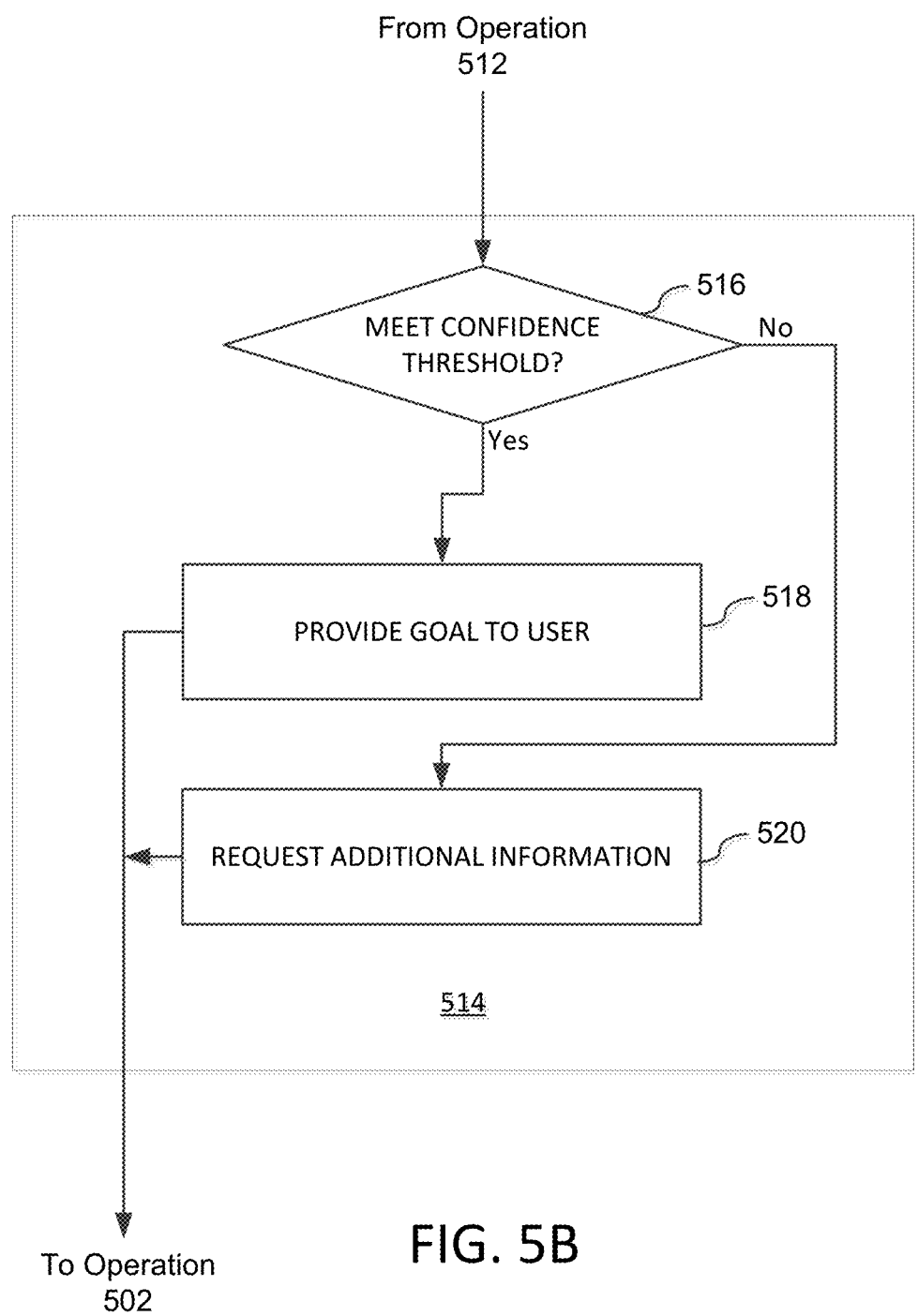
FIG. 5B is a flow diagram illustrating an example of a method for sending an action as shown in FIG. 5A.

An action is sent based on the one or more determined user goals at operation 514. The action is instructions to perform a user command, meet a user request, or request additional data. The action sent at operation 514 varies based on the user goal, confidence indicator of the user goal, weighted connections to the user goal, and/or the context of the user goal. In some embodiments, a user goal is compared to a confidence threshold at operation 516, as illustrated in FIG. 5B. If the determined goal based on its confidence indicators and/or weighted connections does not meet the confidence threshold at operation 512, operation 520 is performed. If a determined goal based on its weighted connections and/or the confidence indicator meets the confidence threshold at operation 516, operation 518 is performed. In further embodiments, at operation 514 an action is selected based on the probability distribution across nodes. For example, at operation 514 a model may be trained to associate the distribution and/or spread of confidence indicators across the nodes and/or entities in the state graph with the appropriate action to select. Additionally, the model may be trained to learn mapping between distributions over confidence indicators and actions and/or trained to classify distributions with an action being associated with each classification label at operation 514. For example, repeated system performance of the distribution to action mappings or classifications at operation 514 may be utilized to learn the best mappings and classifications. As such, in some embodiments at operation 514, one or more user goals are determined by classifying patterns of confidence indicator utilizing machine learning models.

As illustrated in FIG. 5B, at operation 518 the context of the determined goal is evaluated and instructions to perform that context are sent for performance. For example, if the goal was purchasing a movie ticket, instructions to perform this task are sent to the user at operation 518. In another example, if the determined goal was to change a setting on a device, instructions are sent to change the requested setting at operation 518. In an additional example, if the determined goal was a request for information, instructions to retrieve and provide the information to user are sent at operation 518. Additionally, at operation 518 instructions to respond to the user via a machine generated spoken response may be part of the instructions sent at operation 518. Alternatively or in addition, at operation 518 instructions to respond to the user via other modalities may be part of the instructions sent at operation 518. For example, instructions to verbally notify the user that the tickets were bought, setting changes were made, or that data was found and presented may be included in the instructions. The execution of spoken language output and/or other modalities by a device may constitute a system turn in a conversation between a user and a device. The receipt of spoken language input and/or other modalities from a user by a device, may constitute a user turn in a conversation between a user and a device User feedback, such as additional information instructions are sent at operation 520. The additional feedback will be specific to the one or more determined goal in order to clarify the user intent or desired goal. For example, the instructions may include clarification to distinguish between two different potential user goals, such as bus departure time or a train departure time. In some embodiment, feedback instructions are a machine generated spoken response and/or other machine generated modalities at operation 512.

Accordingly, method 500 adapts quickly to changes in user data, spoken language requests, and relationships between entities and/or attributes. For example, method 500 can maintain separate state graphs that arrive at separate user goals simultaneously. Additionally, the ability of method 500 to maintain and update separate state graphs on a real time basis allows for multiple intents to be inferred and allows for multiple intents to be maintained and updated upon receiving additional spoken language input across multiple turns of a conversation. Further, the separation between the state graphs and the knowledge base frameworks allows each to be easily modified and updated without affecting the other. As such, method 500 prevents the user from having to explicitly state each intent and desired goal while still determining the desired goal from the device to improve a user's ability to accomplish tasks, perform commands, and get desired products and/or services. Additionally, method 500 provides better responses to spoken language inputs from a user to improve user interactions with a device.

In some embodiments, a method for responding to spoken language input is disclosed. This method includes means for receiving user data and a first spoken language input from the device and means for identifying tags within the first spoken language input. The method further includes means for searching a knowledge base framework based on the tags and the user data. The knowledge base framework is a database that includes a plurality of entities, attributes, and relationships between the entities and the attributes. Additionally, the method includes means for identifying entities, attributes, and relationship within the knowledge base framework that match at least one of the tags and the user data and means for identifying at least one interconnected item within the knowledge base framework that did not match any of the tags and the user data to form at least one inferred item. The method also includes means for creating a state graph based on a portion of the knowledge base framework that includes any matched entities, matched attributes, identified relationships, and the at least one inferred item, and based on the tags. The state graph is created at least in part by transforming the portion of the knowledge base framework into a probabilistic model graph by replacing the identified relationships with weighted connections and by assigning a confidence indicator to each node of the state graph. The method also includes means for determining at least one goal based on the state graph and means for sending instructions to perform an action to the device based on the at least one goal, the weighted connections, and the confidence indicators.

In some embodiments, a method for responding to spoken language input is disclosed. This method includes means for receiving user data and a second spoken language input from a device. The method also includes means for identifying tags within the second spoken language input in view of previously determined tags from a first spoken language input in a conversation between a user and the device. The method further includes means for searching a knowledge base framework based on the tags and the user data and means for identifying entities, attributes, and relationship within the knowledge base framework that match at least one of the tags and the user data. Additionally, the method includes means for creating an updated state graph based on a portion of the knowledge base framework that includes any matched entities, matched attributes, and identified relationships by aligning any of the matched entities and the matched attributes to a node in a stored state graph. The updated state graph is formed, at least in part, by transforming the portion of the knowledge base framework into a probabilistic model graph. Further, the method includes means for determining at least one user goal based on the updated state graph and means for sending instructions to perform an action to the device based on the at least one user goal and a confidence indicator for the at least one user goal.

Figure 6:
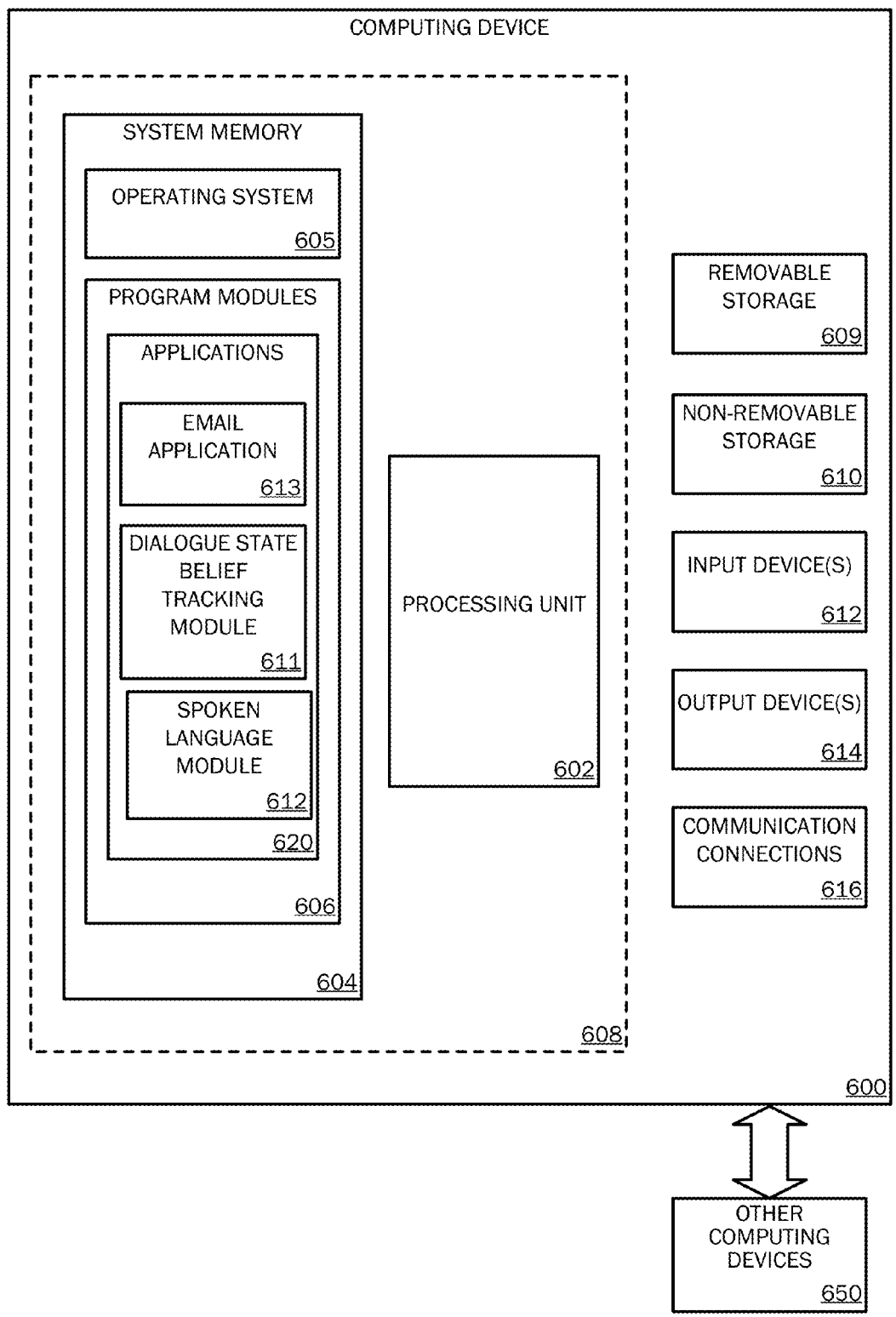
FIG. 6 is a block diagram illustrating example physical components of a computing device with which embodiments of the disclosure may be practiced.

FIGS. 6-9 and the associated descriptions provide a discussion of a variety of operating environments in which embodiments of the disclosure may be practiced. However, the devices and systems illustrated and discussed with respect to FIGS. 6-9 are for purposes of example and illustration and are not limiting of a vast number of computing device configurations that may be utilized for practicing embodiments of the disclosure, described herein FIG. 6 is a block diagram illustrating physical components (e.g., hardware) of a computing device 600 with which embodiments of the disclosure may be practiced. For example, the DSBT system 112 and/or the spoken language system 114 shown as operating in the cloud 110 in FIG. 1 could be implemented by the computing device 600. The computing device components described below may include computer executable instructions for a dialogue state belief tracking (DSBT) module 611 that can be executed to employ the method 500 and implement portions of the system 100 disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620 such as the DSBT module 611. The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610. For example, the user data 108, state graphs 120, spoken language input 106, tags, etc. could be stored on any of the illustrated storage devices.

As stated above, a number of program modules and data files may be stored in the system memory 604. While executing on the processing unit 602, the program modules 606 (e.g., DSBT module 611, spoken language module 612, or email application 613) may perform processes including, but not limited to, a system for responding to spoken language input 106 as described herein. For example, the processing unit 602 may implement a spoken language module 612 and/or a dialogue state belief tracking module 611. In some embodiments, the DSBT module 611 includes the spoken language module 612. Other program modules that may be used in accordance with embodiments of the present disclosure, and in particular to generate screen content, may include electronic mail and contacts applications, word processing applications, spreadsheet applications, database applications, slide presentation applications, drawing, messaging applications, and/or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650, such as the user device 104. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
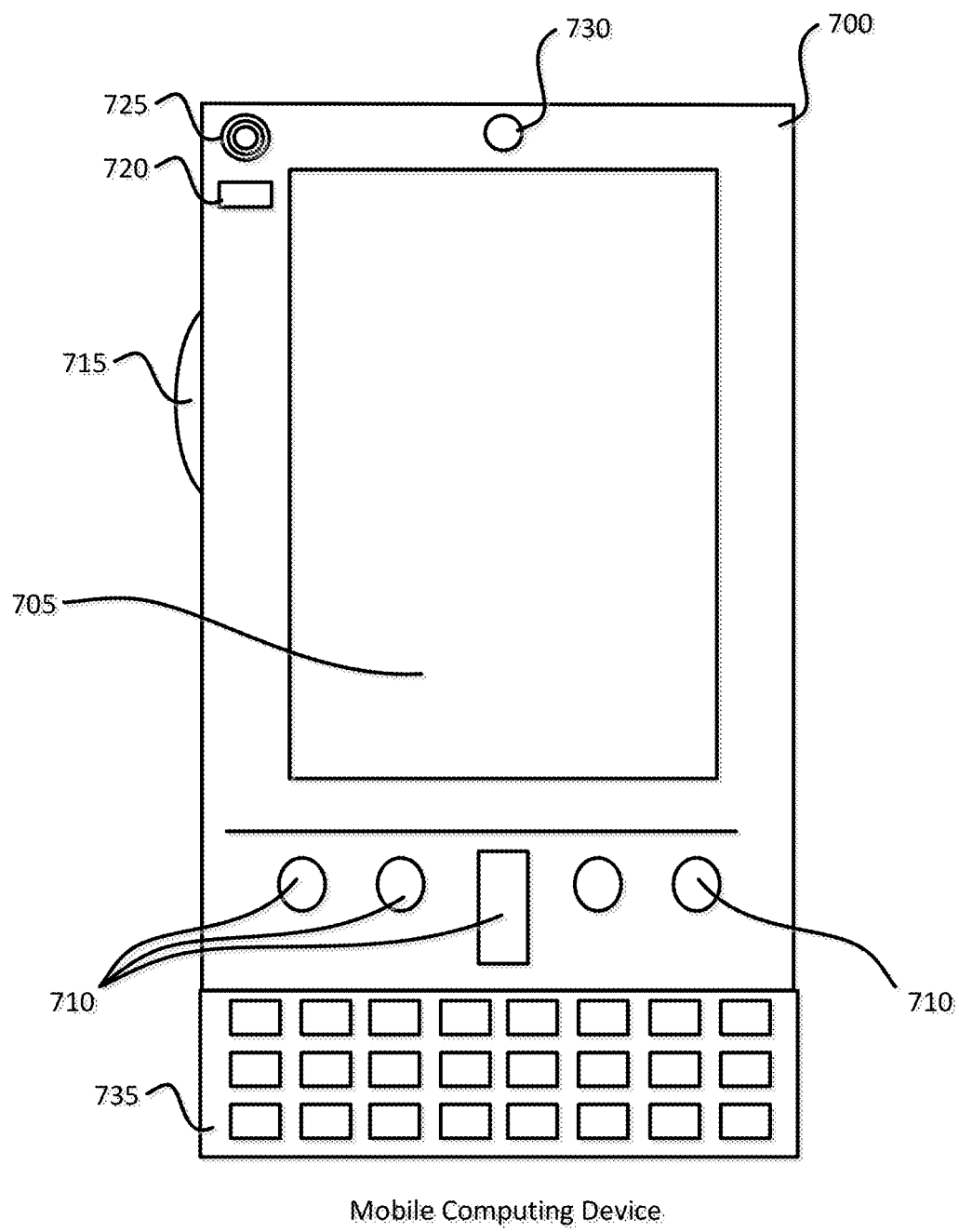
FIGS. 7A and 7B are simplified block diagrams of a mobile computing device with which embodiments of the present disclosure may be practiced.
Figure 7B:
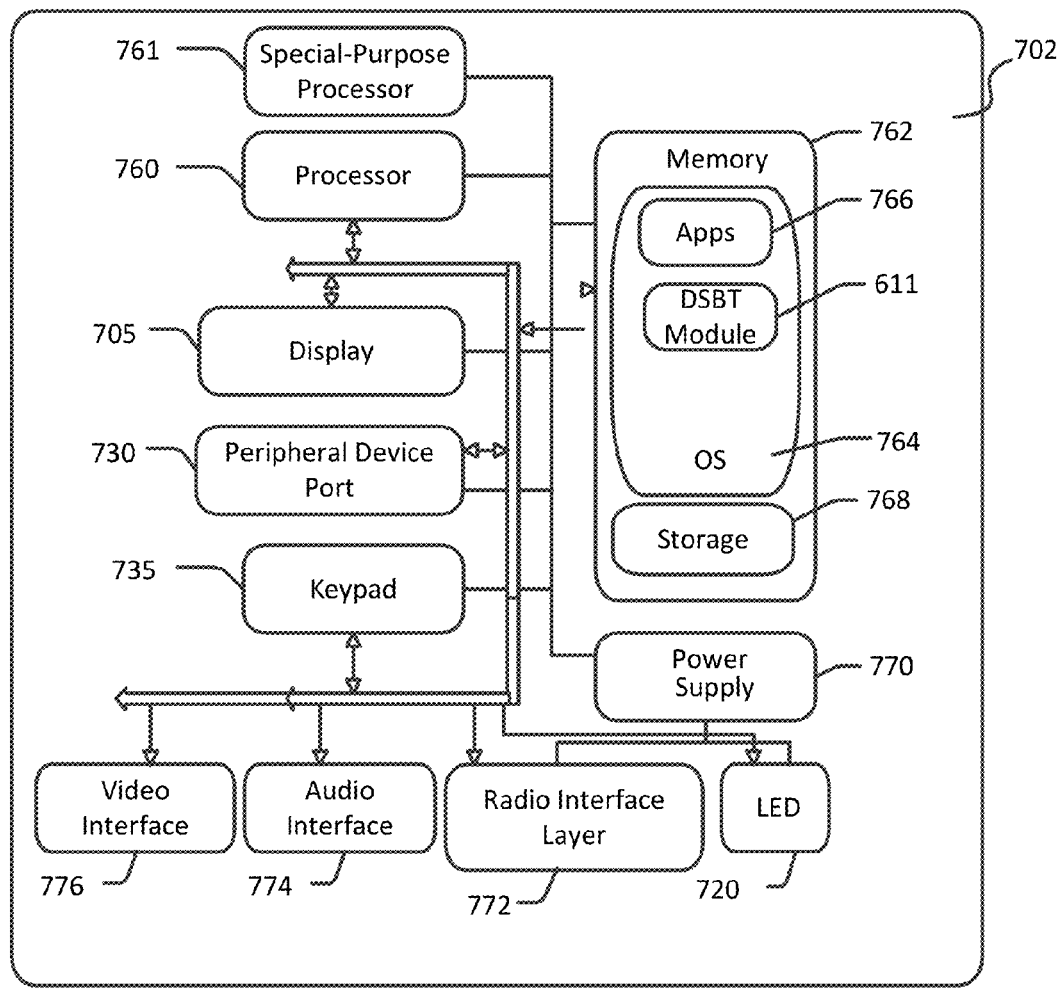

FIGS. 7A and 7B illustrate a mobile computing device 700, for example, a mobile telephone, a smart phone, wearable computer (such as a smart watch), a tablet personal computer, a laptop computer, and the like, with which embodiments of the disclosure may be practiced. For instance, the user device 104 could be implemented by the mobile computing device 700. With reference to FIG. 7A, one embodiment of a mobile computing device 700 suitable for implementing the embodiments is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In addition to, or in place of a touch screen input device associated with the display 705 and/or the keypad 735, a Natural User Interface (NUI) may be incorporated in the mobile computing device 700. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various embodiments, the output elements include the display 705 for showing a graphical user interface (GUI). In embodiments disclosed herein, the various user information collections could be displayed on the display 705. Further output elements may include a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (e.g., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766 and/or a DSBT module 611 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions to make user inferences based on received user data and determine connection between the made user inferences and relevant information (e.g., weather information, traffic information, advertisements, and etc.) as described herein (e.g., DSBT module 611).

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation or to receive spoken language input by system 702. In some embodiments, the microphone may also serve as an audio sensor to facilitate control of notifications, as will be described below. The system 702 may further include a video interface 776 that enables an operation of an on-board camera 730 to record still images, video stream, and the like. In some embodiment, a camera is utilized by the mobile computing device 700 to capture non-verbal communication acts expressed by the user such as facial expression, eye gaze and gesture for the purposes of signaling them to the spoken language module 612 and/or DSBT module 611.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems. User data 108 and/or spoken language input 106 may be provided from the user device 104 to the DSBT system 112 and/or spoken language system 114 in this manner.

Figure 8:
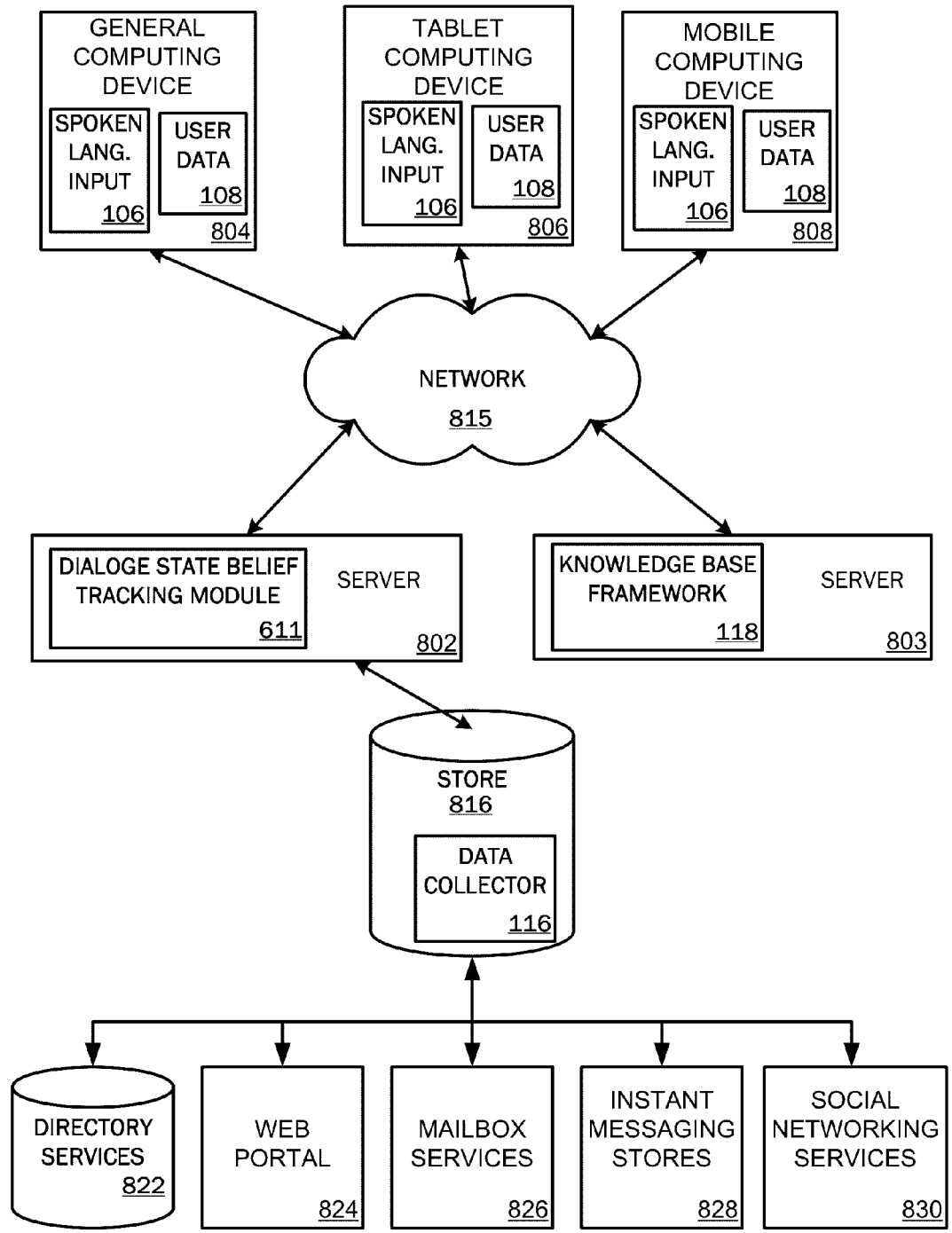
FIG. 8 is a simplified block diagram of a distributed computing system in which embodiments of the present disclosure may be practiced.

FIG. 8 illustrates one embodiment of the architecture of a system for processing data received at a computing system from a remote source, such as a general computing device 804, tablet 806, or mobile device 808, as described above. Content displayed at server device 802 may be stored in different communication channels or other storage types. For example, various documents may be stored using a directory service 822, a web portal 824, a mailbox service 826, an instant messaging store 828, or a social networking site 830. By way of example, the user device 104 may be embodied in a general computing device 804, a tablet computing device 806 and/or a mobile computing device 808 (e.g., a smart phone). User data 108 and/or spoken language input 106 may be transmitted to the server device 802, which may be configured to implement the DSBT module 611, via the network 815. Further, server 802 may communicate with server 803 configured to create, implement, and update a knowledge base framework via the network 815. In some implementations, user data 108 and/or spoken language input 106 are periodically transmitted to the server device 802 and are stored in the data collector 116 of the store 816. Additionally, a portion of the knowledge base framework 118 may be transmitted from server 803 to server 802 or retrieved by server 802 from server 803, via the network 815. In some embodiments, the portion is retrieved in real time in response to a received spoken language input by the server 802. In further embodiments, any created state graphs 120 by the implementation of the DSBT module are stored at least for a predetermined period of time on data collector 116 of the store 816.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary embodiments were provided so that this disclosure was thorough and complete and fully conveyed the scope of the other possible embodiments to those skilled in the art. For example, aspects of the various embodiments disclosed herein may be modified and/or combined without departing from the scope of this disclosure.

Although specific embodiments were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

The invention claimed is:

1. A method for controlling the response to spoken language input, comprising:
   receiving user data from a device;
   receiving a first spoken language input from the device;
   identifying tags within the first spoken language input;
   searching a knowledge base framework based on the tags and the user data, wherein the knowledge base framework is a database that includes a plurality of entities, attributes, and relationships between the entities and the attributes;
   identifying entities, attributes, and relationship within the knowledge base framework that match at least one of the tags and the user data;

identifying at least one interconnected item within the knowledge base framework that did not match any of the tags and the user data to form at least one inferred item;

creating a state graph based on a portion of the knowledge base framework that includes any matched entities, matched attributes, identified relationships, and the at least one inferred item, and based on the tags, wherein the state graph is created at least in part by transforming the portion of the knowledge base framework into a probabilistic model graph by replacing the identified relationships with weighted connections and by assigning a confidence indicator to each node of the state graph;

determining at least one goal based on the state graph; and sending instructions to perform an action to the device based on the at least one goal, the weighted connections, and the confidence indicators.

2. The method of claim 1, further comprising:

receiving a second spoken language input;

identifying additional tags within the second spoken language input;

searching the knowledge base framework based on the additional tags;

identifying additional entities, additional attributes, and additional relationships within the knowledge base framework that match at least some of the additional tags;

identifying at least one additional interconnected item within the knowledge base framework that did not match any of the additional tags and the user data to form at least one additional inferred item;

updating the state graph based on a second portion of the knowledge base framework that includes any matched additional entities, matched additional attributes, identified additional relationships, and the at least one additional inferred item, and based on the additional tags, wherein the state graph updates the weighted connections and the confidence indicators based on the second portion of the knowledge base framework and the additional tags to form updated weighted connections and updated confidence indicators;

determining at least one additional goal based on an updated state graph; and sending additional instructions to perform another action to the device based on the at least one additional goal, the updated weighted connections, and the updated confidence indicators.

3. The method of claim 1, further comprising comparing the confidence indicators and the weighted connections to a threshold.

4. The method of claim 3, further comprising:

wherein the action is a request for user feedback about the at least one goal when the confidence indicators and the weighted connections do not meet the threshold;

receiving user feedback about the at least one goal from the device; and identifying feedback tags within the user feedback in view of the tags identified for the first spoken language input;

searching the knowledge base framework based on the feedback tags;

identifying feedback entities, feedback attributes, and feedback relationships within the knowledge base framework that match at least some of the feedback tags;

updating the state graph based on a second portion of the knowledge base framework that includes any matched feedback entities, matched feedback attributes, and identified feedback relationships, and based on the feedback tags, wherein the state graph updates the weighted connections and the confidence indicators based on the second portion of the knowledge base framework and the feedback tags to form updated weighted connections and updated confidence indicators;

determining at least one additional goal based on an updated state graph; and sending additional instructions to perform an additional action to the device based on the at least one additional goal, the updated weighted connections, and the updated confidence indicators.

5. The method of claim 3, wherein the action is providing the at least one goal to a user when the confidence indicator for the at least one goal meets the threshold.

6. The method of claim 5, wherein the action is providing information to the user via a spoken language output.

7. The method of claim 1, wherein the determining the at least one goal based on the state graph comprises:

classifying patterns of the confidence indicators utilizing machine learning models.

8. The method of claim 1, wherein the user data includes a location of the device and user preferences.

9. The method of claim 1, wherein at least one of the tags include a user intent and a contradictory tag.

10. The method of claim 1, wherein the device is at least one of:

a mobile telephone;
a smart phone;
a tablet;
a smart watch;
a wearable computer;
a personal computer;
a desktop computer;
a gaming system; and
a laptop computer.

11. The method of claim 1, wherein the portion includes two separate sections of the knowledge base framework and the state graph includes two separate probabilistic model graphs.

12. The method of claim 1, wherein the state graph includes evidence nodes and edge nodes.

13. The method of claim 1, further comprising:

ranking nodes of the state graph based at least on the confidence indicators, wherein the determining the at least one goal is based on the ranking of the nodes.

14. The method of claim 1, wherein the confidence indicator considers a confidence level of a related tag and known user preferences.

15. A system comprising:

a computing device including a processing unit and a memory, the processing unit implementing a spoken language system and a dialogue state belief tracking system, the spoken language system is operable to:
receive a spoken language input,
identify tags within the spoken language input, and
communicate with the dialogue state belief tracking system; and wherein the dialogue state belief tracking system is operable to:
communicate with the spoken language system,
search a knowledge base framework based on the tags identified by the spoken language system;

identify entities, attributes, and relationships within the knowledge base framework that match at least some of the tags;

create a state graph based on a portion of the knowledge base framework that includes any matched entities, matched attributes, and identified relationships, wherein the state graph is formed by transforming the portion into a probabilistic model graph and by adding evidence nodes to the probabilistic model graph based on the tags, and wherein the state graph includes a confidence indicator for each node of the state graph;

rank nodes of the state graph;

determine at least one goal based on the rank of the nodes of the state graph; and send instructions to perform an action based on the at least one goal.

16. The system of claim 15, wherein the action is to perform the at least one goal.

17. The system of claim 15, wherein the action is to request user feedback about the at least one goal.

18. The system of claim 15, wherein the dialogue state belief tracking system is further operable to:

receive user data, search the knowledge base framework based on the user data;

identify at least one additional entity, additional attribute, and additional relationship that match the user data;

identify a second portion of the knowledge base framework that includes any matched additional entity, matched additional attribute, and matched additional relationship to the user data; and update the state graph based on the second portion of the knowledge base framework, wherein the second portion is clamped on to the state graph by aligning common nodes.

19. The system of claim 18, wherein the user data is a location of a user device.

20. A computer-readable storage device including computer-executable instructions stored thereon which, when executed by a computing system in a distributed network, cause the computing system to perform a method comprising:

receiving user data from a device;

receiving a second spoken language input from the device;

identifying tags within the second spoken language input in view of previously determined tags from a first spoken language input in a conversation between a user and the device;

searching a knowledge base framework based on the tags and the user data;

identifying entities, attributes, and relationship within the knowledge base framework that match at least one of the tags and the user data;

creating an updated state graph based on a portion of the knowledge base framework that includes any matched entities, matched attributes, and identified relationships by aligning any of the matched entities and the matched attributes to a node in a stored state graph, wherein the updated state graph is formed, at least in part, by transforming the portion of the knowledge base framework into a probabilistic model graph;

determining at least one user goal based on the updated state graph; and sending instructions to perform an action to the device based on the at least one user goal and a confidence indicator for the at least one user goal.

* * * * *